United States Patent
Kunz et al.

(10) Patent No.: US 11,447,246 B2
(45) Date of Patent: Sep. 20, 2022

(54) MODULAR AIRCRAFT WITH VERTICAL TAKEOFF AND LANDING CAPABILITY

(71) Applicant: Insitu, Inc., Bingen, WA (US)

(72) Inventors: Peter Josef Kunz, Kirkwood, MO (US); David Wayne Goodrich, Moses Lake, WA (US); Jacob Scott Allen, Mosier, OR (US); Matthew Jacob Bartow, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 0 days.

(21) Appl. No.: 16/090,162

(22) PCT Filed: May 7, 2018

(86) PCT No.: PCT/US2018/031330
§ 371 (c)(1),
(2) Date: Sep. 28, 2018

(87) PCT Pub. No.: WO2018/208652
PCT Pub. Date: Nov. 15, 2018

(65) Prior Publication Data
US 2021/0197965 A1     Jul. 1, 2021

Related U.S. Application Data

(60) Provisional application No. 62/502,768, filed on May 8, 2017.

(51) Int. Cl.
*B64C 39/02* (2006.01)
*B64C 29/00* (2006.01)
*B64C 29/04* (2006.01)

(52) U.S. Cl.
CPC ........ *B64C 39/024* (2013.01); *B64C 29/0025* (2013.01); *B64C 29/04* (2013.01);
(Continued)

(58) Field of Classification Search
CPC ........ B64C 2201/021; B64C 2201/042; B64C 2201/088; B64C 2201/104;
(Continued)

(56) References Cited

U.S. PATENT DOCUMENTS

| 1,726,062 A | * | 8/1929 | Gilman | ..................... B64B 1/20 244/48 |
| D178,598 S | * | 8/1956 | Fletcher | ....................... D12/327 |

(Continued)

FOREIGN PATENT DOCUMENTS

| FR | 1059020 | 3/1954 |
| WO | WO2013070296 | 5/2013 |
| WO | WO2015157114 | 10/2015 |

OTHER PUBLICATIONS

Insitu Corporation, "Integrator" brochure, available at <https://insitu.com/information-delivery/unmanned-systems/integrator#2>, retrieved on Mar. 27, 2018.

(Continued)

*Primary Examiner* — Medhat Badawi

(57) ABSTRACT

An aircraft includes a fuselage module and at least two vertical lift rotor modules supporting at least four rotor assemblies. Each rotor assembly is supported by a rotor boom having at least one boom free end and a boom mounting portion. Each rotor assembly has at least one vertical lift rotor mounted on the boom free end. Each boom mounting portion is removably couplable to the fuselage module. The vertical lift rotor modules are configured such that when coupled to the fuselage module, a pair of the rotor assemblies are located on each of laterally opposite sides of the fuselage module, and the rotor assemblies of each pair are respectively located forward of and aft of a wing center portion. A pair of wings are configured to be removably couplable to the wing center portion. The aircraft includes a (Continued)

forward thrust module removably couplable to the fuselage body.

22 Claims, 21 Drawing Sheets

(52) U.S. Cl.
CPC .. *B64C 2201/021* (2013.01); *B64C 2201/042* (2013.01); *B64C 2201/088* (2013.01); *B64C 2201/104* (2013.01); *B64C 2201/108* (2013.01); *B64C 2211/00* (2013.01)

(58) Field of Classification Search
CPC ........... B64C 2201/108; B64C 2211/00; B64C 29/0025; B64C 29/04; B64C 39/024; B64C 27/048; B64C 27/26; B64C 2201/165
See application file for complete search history.

(56) References Cited

U.S. PATENT DOCUMENTS

| | | | | |
|---|---|---|---|---|
| 3,181,810 | A * | 5/1965 | Olson | B64C 29/0033 244/7 R |
| 3,246,861 | A * | 4/1966 | Alfred | B64C 29/0033 244/7 A |
| 4,437,630 | A * | 3/1984 | Jefferies | B64D 1/18 239/171 |
| 5,823,468 | A * | 10/1998 | Bothe | B64B 1/18 244/2 |
| 5,941,478 | A * | 8/1999 | Schmittle | B64C 29/0033 244/48 |
| 6,293,491 | B1 * | 9/2001 | Wobben | B64C 31/00 244/17.23 |
| 6,607,161 | B1 * | 8/2003 | Krysinski | B64C 9/00 244/7 A |
| 7,267,300 | B2 * | 9/2007 | Heath | B64C 15/14 244/12.3 |
| 7,398,946 | B1 * | 7/2008 | Marshall | B60L 53/12 244/58 |
| 7,699,260 | B2 * | 4/2010 | Hughey | B64C 27/08 244/17.23 |
| 7,699,261 | B2 * | 4/2010 | Colten | B64C 39/024 244/45 R |
| 7,789,342 | B2 * | 9/2010 | Yoeli | B60V 3/02 244/23 B |
| 9,045,226 | B2 * | 6/2015 | Piasecki | B64C 27/32 |
| 9,120,560 | B1 * | 9/2015 | Armer | B64C 29/0025 |
| 9,150,301 | B2 | 10/2015 | Liu | |
| 9,187,174 | B2 * | 11/2015 | Shaw | B64C 27/28 |
| 9,266,610 | B2 * | 2/2016 | Knapp | B64C 39/024 |
| 9,340,301 | B2 * | 5/2016 | Dickson | B64F 1/04 |
| 9,409,642 | B1 * | 8/2016 | Pingree | B64C 29/0025 |
| 9,708,059 | B2 * | 7/2017 | Logan | B64C 39/024 |
| 9,764,833 | B1 * | 9/2017 | Tighe | B64C 29/0025 |
| 9,868,524 | B2 * | 1/2018 | Welsh | B64C 39/024 |
| 9,889,930 | B2 * | 2/2018 | Welsh | A63H 27/12 |
| 9,902,489 | B2 * | 2/2018 | Fisher | B64C 3/10 |
| D816,547 | S * | 5/2018 | Cui | D12/16.1 |
| D822,579 | S * | 7/2018 | Lienhard | D12/328 |
| 10,029,785 | B2 * | 7/2018 | Niedzballa | B64D 27/02 |
| 10,046,853 | B2 * | 8/2018 | Vander Mey | B64C 27/02 |
| 10,053,213 | B1 * | 8/2018 | Tu | B64C 39/024 |
| 10,081,436 | B1 * | 9/2018 | Tian | B64D 31/00 |
| D832,154 | S * | 10/2018 | Tian | D12/161 |
| 10,124,890 | B2 * | 11/2018 | Sada-Salinas | B64D 1/02 |
| 10,131,426 | B2 * | 11/2018 | Judas | B64D 27/24 |
| 10,137,982 | B1 * | 11/2018 | Dormiani | B64C 27/39 |
| 10,183,746 | B2 * | 1/2019 | McCullough | B64C 29/0033 |
| 10,214,285 | B2 * | 2/2019 | McCullough | B64C 29/02 |
| D843,306 | S * | 3/2019 | Tzarnotzky | D12/329 |
| D843,919 | S * | 3/2019 | Tzarnotzky | D12/329 |
| 10,227,133 | B2 * | 3/2019 | McCullough | B64C 11/28 |
| 10,232,950 | B2 * | 3/2019 | McCullough | B64C 39/02 |
| 10,252,796 | B2 * | 4/2019 | Reichert | B64C 39/062 |
| 10,301,016 | B1 * | 5/2019 | Bondarev | B64C 29/0033 |
| D852,092 | S * | 6/2019 | Woodworth | D12/16.1 |
| 10,315,761 | B2 * | 6/2019 | McCullough | B64C 29/02 |
| 10,317,914 | B2 * | 6/2019 | Douglas | B64C 29/0008 |
| 10,322,799 | B2 * | 6/2019 | McCullough | B64D 17/025 |
| 10,329,014 | B2 * | 6/2019 | McCullough | B64C 39/08 |
| 10,336,443 | B2 * | 7/2019 | Louis | B64C 27/30 |
| 10,351,232 | B2 * | 7/2019 | McCullough | B64C 27/605 |
| 10,364,036 | B2 * | 7/2019 | Tighe | B64D 27/24 |
| D856,898 | S * | 8/2019 | Evulet | D12/335 |
| D856,899 | S * | 8/2019 | Evulet | D12/335 |
| 10,399,673 | B1 * | 9/2019 | Roop | B64C 29/0033 |
| 10,435,169 | B2 * | 10/2019 | Steinwandel | B64C 29/0025 |
| 10,442,522 | B2 * | 10/2019 | Oldroyd | B64C 27/52 |
| D868,627 | S * | 12/2019 | Evulet | D12/4 |
| D868,668 | S * | 12/2019 | Parvizian | D12/328 |
| 10,501,193 | B2 * | 12/2019 | Oldroyd | B64D 27/26 |
| D872,681 | S * | 1/2020 | Tzarnotzky | D12/329 |
| D873,202 | S * | 1/2020 | Tzarnotzky | D12/329 |
| 10,525,832 | B2 * | 1/2020 | Zhao | B60L 11/1822 |
| 10,526,065 | B2 * | 1/2020 | Thomassey | B64C 27/26 |
| D875,840 | S * | 2/2020 | Wu | D21/447 |
| D876,988 | S * | 3/2020 | Stepura | D12/16.1 |
| 10,597,164 | B2 * | 3/2020 | Oldroyd | G05D 1/0072 |
| 10,604,249 | B2 * | 3/2020 | McCullough | B64C 27/30 |
| D881,106 | S * | 4/2020 | Parvizian | D12/319 |
| D881,107 | S * | 4/2020 | Parvizian | D12/319 |
| 10,618,646 | B2 * | 4/2020 | McCullough | B64C 27/32 |
| 10,618,647 | B2 * | 4/2020 | McCullough | B64C 39/02 |
| 10,625,853 | B2 * | 4/2020 | McCullough | B64C 39/024 |
| 10,633,087 | B2 * | 4/2020 | McCullough | G05D 1/101 |
| 10,633,088 | B2 * | 4/2020 | McCullough | G05D 1/0094 |
| 10,661,892 | B2 * | 5/2020 | McCullough | B64C 25/36 |
| D887,950 | S * | 6/2020 | Evulet | D12/335 |
| D890,074 | S * | 7/2020 | Parvizian | D12/333 |
| 10,723,433 | B2 * | 7/2020 | Woodworth | B64F 5/10 |
| 10,737,765 | B2 * | 8/2020 | Oldroyd | B64C 29/02 |
| 10,737,778 | B2 * | 8/2020 | Oldroyd | B64C 1/32 |
| 10,807,707 | B1 * | 10/2020 | Ter Keurs | B64D 9/00 |
| 10,870,487 | B2 * | 12/2020 | McCullough | B64D 25/12 |
| 10,981,661 | B2 * | 4/2021 | Oldroyd | B64C 27/52 |
| 11,027,837 | B2 * | 6/2021 | McCullough | B64D 27/26 |
| 11,034,445 | B2 * | 6/2021 | Woodworth | B64C 39/024 |
| 2003/0057325 | A1 * | 3/2003 | Carroll | B64C 39/024 244/120 |
| 2003/0066932 | A1 * | 4/2003 | Carroll | B64C 39/028 244/120 |
| 2003/0085319 | A1 * | 5/2003 | Wagner | B64C 29/0025 244/12.3 |
| 2004/0245374 | A1 * | 12/2004 | Morgan | B64C 5/02 244/12.3 |
| 2005/0230519 | A1 * | 10/2005 | Hurley | B64C 39/08 244/7 C |
| 2006/0151666 | A1 * | 7/2006 | VanderMey | B64C 39/062 244/12.3 |
| 2007/0018035 | A1 * | 1/2007 | Saiz | B64C 29/0033 244/12.3 |
| 2007/0187547 | A1 * | 8/2007 | Kelly | B64B 1/30 244/7 R |
| 2008/0149758 | A1 * | 6/2008 | Colgren | B64C 39/024 244/13 |
| 2008/0217486 | A1 * | 9/2008 | Colten | B64C 39/024 244/45 R |
| 2009/0008499 | A1 * | 1/2009 | Shaw | B64C 27/08 244/17.23 |
| 2010/0065677 | A1 * | 3/2010 | Ferrier | B64C 27/26 244/6 |
| 2011/0001020 | A1 * | 1/2011 | Forgac | B64C 39/024 244/7 A |
| 2012/0119016 | A1 * | 5/2012 | Shaw | B64C 27/20 244/12.3 |
| 2013/0020429 | A1 * | 1/2013 | Kroo | B64C 3/16 244/6 |
| 2013/0062455 | A1 * | 3/2013 | Lugg | B64C 39/12 244/12.3 |

(56) References Cited

U.S. PATENT DOCUMENTS

| | | | | |
|---|---|---|---|---|
| 2014/0332620 | A1* | 11/2014 | Earon | B64D 47/08 |
| | | | | 244/13 |
| 2016/0129998 | A1* | 5/2016 | Welsh | B64C 27/24 |
| | | | | 244/12.3 |
| 2016/0200436 | A1* | 7/2016 | North | B64C 25/52 |
| | | | | 244/7 R |
| 2016/0207625 | A1 | 7/2016 | Judas et al. | |
| 2016/0236774 | A1* | 8/2016 | Niedzballa | B64D 27/24 |
| 2016/0272296 | A1* | 9/2016 | Fink | B64C 1/26 |
| 2016/0297520 | A1* | 10/2016 | Sada-Salinas | B64D 17/80 |
| 2016/0318600 | A1* | 11/2016 | Wirasnik | B64C 11/28 |
| 2017/0197725 | A1* | 7/2017 | Foo | B64C 39/024 |
| 2017/0225779 | A1* | 8/2017 | Gamble | B64C 29/0091 |
| 2017/0253319 | A1 | 9/2017 | Vance | |
| 2017/0297675 | A1* | 10/2017 | Fink | B64C 1/06 |
| 2017/0300065 | A1* | 10/2017 | Douglas | G05D 1/0676 |
| 2017/0327200 | A1* | 11/2017 | Probst | B64C 1/26 |
| 2018/0001999 | A1* | 1/2018 | Page | B64C 39/10 |
| 2018/0086458 | A1 | 3/2018 | Sartorius | |
| 2019/0002076 | A1 | 1/2019 | Markley | |
| 2019/0106192 | A1* | 4/2019 | Woodworth | B64C 39/024 |
| 2019/0168872 | A1* | 6/2019 | Grubb | B64C 9/16 |

OTHER PUBLICATIONS

EPO, Examination Report for Appl. No. 18727513.6, dated Nov. 10, 2020.
EPO, Examination Report for Appl. No. 18727513.6, dated Sep. 14, 2021.
Israeli Patent Office, Office Action for Appl. No. 270352, dated Jun. 12, 2022.

* cited by examiner

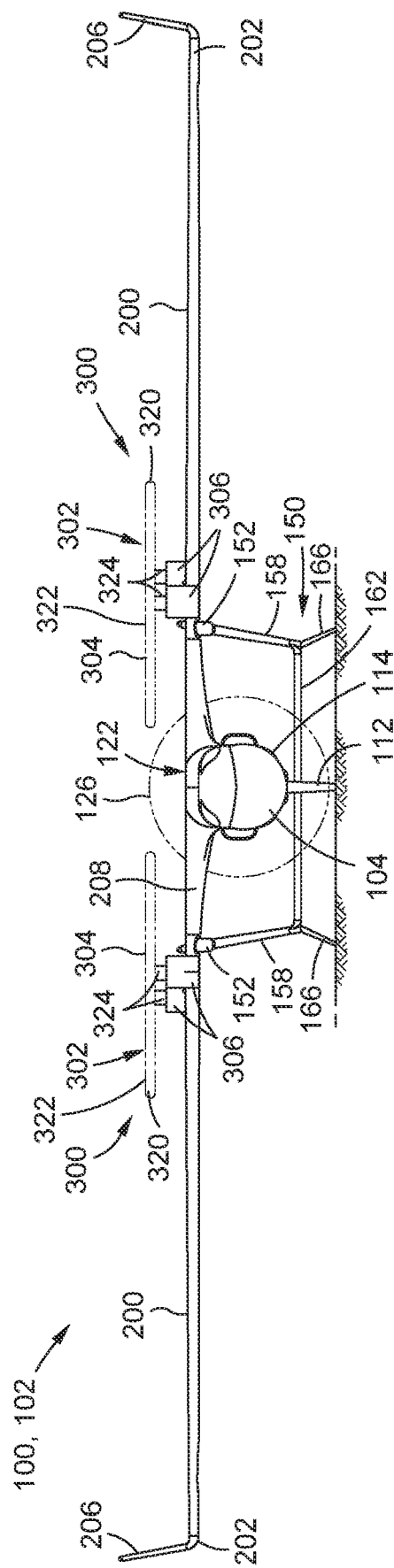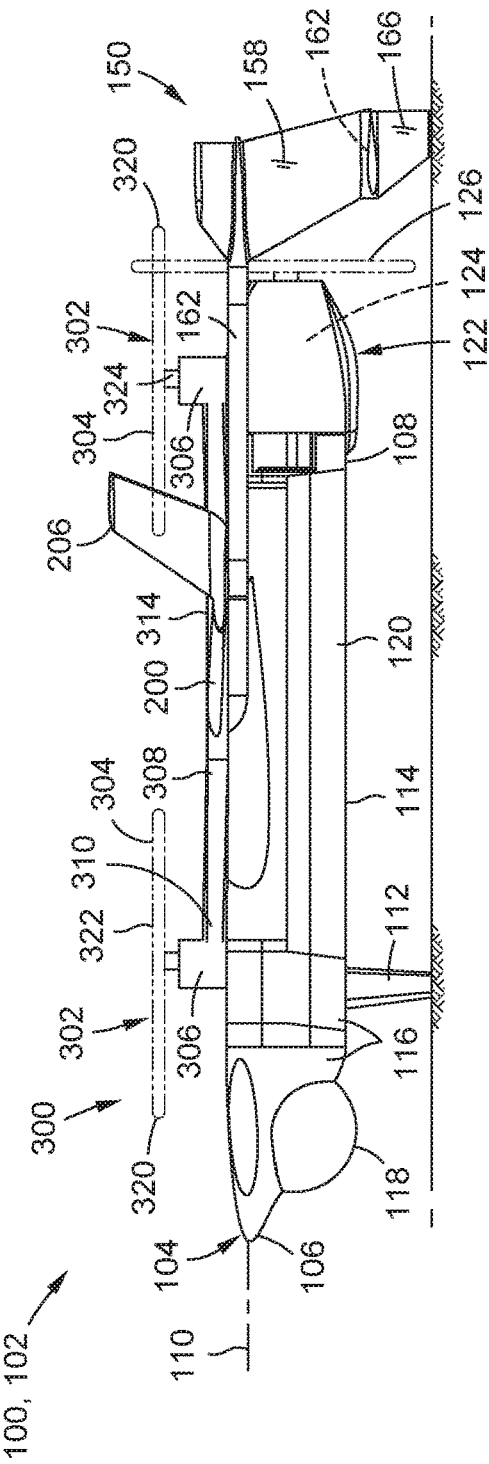

500

502 — REMOVABLY COUPLING AT LEAST TWO VERTICAL LIFT ROTOR MODULES TO THE AIRCRAFT BY REMOVABLY COUPLING A BOOM MOUNTING PORTION OF A ROTOR BOOM OF EACH VERTICAL LIFT ROTOR MODULE TO A FUSELAGE MODULE OF THE AIRCRAFT, THE VERTICAL LIFT ROTOR MODULES COLLECTIVELY SUPPORTING AT LEAST FOUR ROTOR ASSEMBLIES, EACH ROTOR ASSEMBLY BEING SUPPORTED BY THE ROTOR BOOM HAVING THE BOOM MOUNTING PORTION AND HAVING AT LEAST ONE BOOM FREE END SUPPORTING AT LEAST ONE VERTICAL LIFT ROTOR, THE VERTICAL LIFT ROTOR MODULES ARE CONFIGURED SUCH THAT WHEN COUPLED TO THE FUSELAGE MODULE, A PAIR OF THE ROTOR ASSEMBLIES ARE LOCATED ON EACH OF LATERALLY OPPOSITE SIDES OF THE FUSELAGE, AND THE ROTOR ASSEMBLIES OF EACH PAIR ARE RESPECTIVELY LOCATED FORWARD OF AND AFT OF A WING CENTER PORTION OF THE FUSELAGE MODULE

504 — REMOVABLY COUPLING A PAIR OF WINGS TO LATERALLY OPPOSITE CENTER PORTION SIDES OF THE WING CENTER PORTION OF THE FUSELAGE MODULE, THE FUSELAGE HAVING A FORWARD THRUST MODULE FOR FORWARD PROPULSION OF THE AIRCRAFT

702 — REMOVABLY COUPLING TWO GYROCOPTER MODULES TO THE AIRCRAFT BY REMOVABLY COUPLING A WING STUB OF EACH ONE OF THE GYROCOPTER MODULES TO ONE OF LATERALLY OPPOSITE CENTER PORTION SIDES OF A WING CENTER PORTION OF THE AIRCRAFT, EACH GYROCOPTER MODULE HAVING A GYRO ASSEMBLY SUPPORTED ON THE WING STUB, EACH GYRO ASSEMBLY HAVING A FREELY-ROTATABLE GYRO ROTOR FOR GENERATING VERTICAL THRUST, THE LATERALLY OPPOSITE CENTER PORTION SIDES CONFIGURED TO RESPECTIVELY REMOVABLY RECEIVE A PAIR OF WINGS FOR SUPPORTING THE AIRCRAFT DURING FLIGHT AS AN ALTERNATIVE TO THE TWO GYROCOPTER MODULES, THE AIRCRAFT HAVING A FORWARD THRUST MODULE FOR FORWARD PROPULSION OF THE AIRCRAFT

FIG. 24

MODULAR AIRCRAFT WITH VERTICAL TAKEOFF AND LANDING CAPABILITY

CROSS-REFERENCE TO RELATED APPLICATION

This application is a U.S. national phase application of PCT Application No. PCT/US2018/031330 filed on May 7, 2018, and entitled MODULAR AIRCRAFT WITH VERTICAL TAKEOFF AND LANDING CAPABILITY, which claims priority to U.S. Provisional Application No. 62/502,768 filed on May 8, 2017, and entitled MODULAR AIRCRAFT WITH OPTIONAL VERTICAL TAKEOFF AND LANDING CAPABILITIES, the disclosure of the above-referenced applications being incorporated herein by reference in their entirety.

FIELD

The present disclosure relates generally to aircraft configurations and, more particularly, to an unmanned aerial vehicle that is field-configurable for vertical takeoff and landing capability.

BACKGROUND

Unmanned aerial vehicles (UAVs) are increasingly used for performing a variety of functions in civilian, commercial, and military applications. For example, UAVs may be implemented for delivering payloads, performing emergency services such as firefighting management, locating schools of fish, collecting imaging data for surveillance and reconnaissance, and other functions. For certain applications, it is desirable that UAVs are easily transportable to remote locations and are able to be quickly assembled and disassembled in the field (e.g., land or sea) using a minimal number of tools and/or fasteners.

In addition, it is desirable to be able to launch and recover UAVs in environments (e.g., mountainous terrain, at sea) where a dedicated runway may not be available. In one method, a fixed-wing UAV may be launched using a portable catapult launcher and recovered using a portable recovery system having a recovery cord that is vertically suspended from a mast. The UAV may include wing tip mechanisms that latch onto the recovery cord as the UAV flies into the recovery cord, thereby stopping the UAV. Although eliminating the need for a dedicated runway, the portable catapult launcher and portable recovery system add to the cost and complexity of operating the UAV.

As can be seen, there exists a need in the art for an aircraft capable of being launched and recovered without the need for a dedicated runway, and without the need for specialized ground support equipment such as a portable catapult launcher or a portable recovery system. The aircraft preferably provides the option for operating as a fixed-wing aircraft for improved capabilities in terms of endurance, range, payload, speed, and service ceiling.

SUMMARY

The above-noted needs associated with unmanned aerial vehicles are specifically addressed by the present disclosure which provides an aircraft having a fuselage module having a fuselage body and a wing center portion having laterally opposite center portion sides. The aircraft includes a plurality of vertical lift rotor modules collectively supporting a plurality of rotor assemblies. Each rotor assembly is supported by a rotor boom having at least one boom free end and a boom mounting portion. Each rotor assembly as at least one vertical lift rotor mounted on the boom free end. The boom mounting portion of each rotor boom is configured to be removably couplable to the fuselage module. The vertical lift rotor modules are configured such that when coupled to the fuselage module, at least one pair of the rotor assemblies are located on each of laterally opposite sides of the fuselage module, and the rotor assemblies of each pair are respectively located forward of and aft of the wing center portion. The aircraft further includes a pair of wings configured to be removably coupled to the wing center portion respectively proximate the laterally opposite center portion sides. In addition, the aircraft includes a forward thrust module removably couplable to the fuselage body.

Also disclosed is a method of operating an aircraft having vertical lift rotor modules. The method includes removably coupling the vertical lift rotor modules to the aircraft by removably coupling a boom mounting portion of a rotor boom of each vertical lift rotor module to a fuselage module of the aircraft. The vertical lift rotor modules collectively support at least four rotor assemblies as described above. The method additionally includes removably coupling a pair of wings to laterally opposite center portion sides of the wing center portion of the fuselage module. As mentioned above, the fuselage module includes a forward thrust module for forward propulsion of the aircraft.

In addition, disclosed is a method of improving the operation of an aircraft. The method includes performing a vertical takeoff of the aircraft using at least four rotor assemblies supported by at least two vertical lift rotor modules removably coupled to a fuselage module of the aircraft. As described above, each rotor assembly is supported by a rotor boom having at least one boom free end and a boom mounting portion configured to be removably couplable to the fuselage module. As mentioned above, the aircraft includes a pair of wings removably coupled to a wing center portion of the fuselage module, a forward thrust module removably coupled to a fuselage body.

A further example of an aircraft as a fuselage module having a fuselage body and a wing center portion having laterally opposite center portion sides. The aircraft additionally includes a pair of gyrocopter modules each having a gyro assembly supported on a wing stub configured to be removably coupled to the center portion side of the wing center portion. Each gyro assembly as a gyro rotor for generating vertical thrust. The laterally opposite center portion sides our configured to be field-assembled with a pair of wings capable of supporting the aircraft during flight as an alternative to field-assembling the pair of gyrocopter modules to the laterally opposite center portion sides of the wing center module. The aircraft additionally includes a forward thrust module removably couplable to the fuselage body.

Also disclosed is a method of improving the operation of an aircraft. The method includes removably coupling a pair of gyrocopter modules to the aircraft by removably coupling a wing stub of each one of the gyrocopter modules to one of laterally opposite center portion sides of a wing center portion. Each gyrocopter module has a gyro assembly supported on the wing stub. In addition, each gyro assembly has a gyro rotor for generating vertical thrust. As mentioned above, the laterally opposite center portion sides are configured to be field-assembled to a pair of wings for supporting the aircraft during flight as an alternative to the pair of gyrocopter modules. The aircraft also has a forward thrust module for forward propulsion of the aircraft.

Additionally disclosed is a method of operating an aircraft having a pair of gyrocopter modules. The method includes pre-rotating a pair of gyro rotors respectively of a pair of gyro assemblies respectively of a pair gyrocopter modules. As mentioned above, each one of the gyrocopter modules has a wing stub removably couplable to one of laterally opposite center portion sides of a fuselage module. The center portion sides are configured to removably receive a pair of wings capable of supporting the aircraft during flight as an alternative to removably receiving the pair of gyrocopter modules. The method additionally includes performing a substantially vertical takeoff of the aircraft using the gyrocopter modules. In addition, the method includes transitioning to forward flight by increasing, upon vertical takeoff of the aircraft, a forward thrust of a forward thrust module in a manner causing forward motion of the aircraft at least until achieving a forward airspeed at which the gyro rotors are capable of maintaining an altitude of the aircraft.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 8 is a front view of the UAV of FIG. 4 in the assembled state;

FIG. 9 is a side view of the UAV of FIG. 4 in the assembled state;

FIG. 15 is a flowchart of a method of assembling a UAV having vertical lift rotor modules;

FIG. 19A is a sectional view of one of the rotor blades of one of the gyro rotors and illustrating an adjustable rotor blade pitch angle of the rotor blades;

FIG. 24 is a flowchart of a method of assembling a UAV having gyrocopter modules;

DETAILED DESCRIPTION

Figure 1:
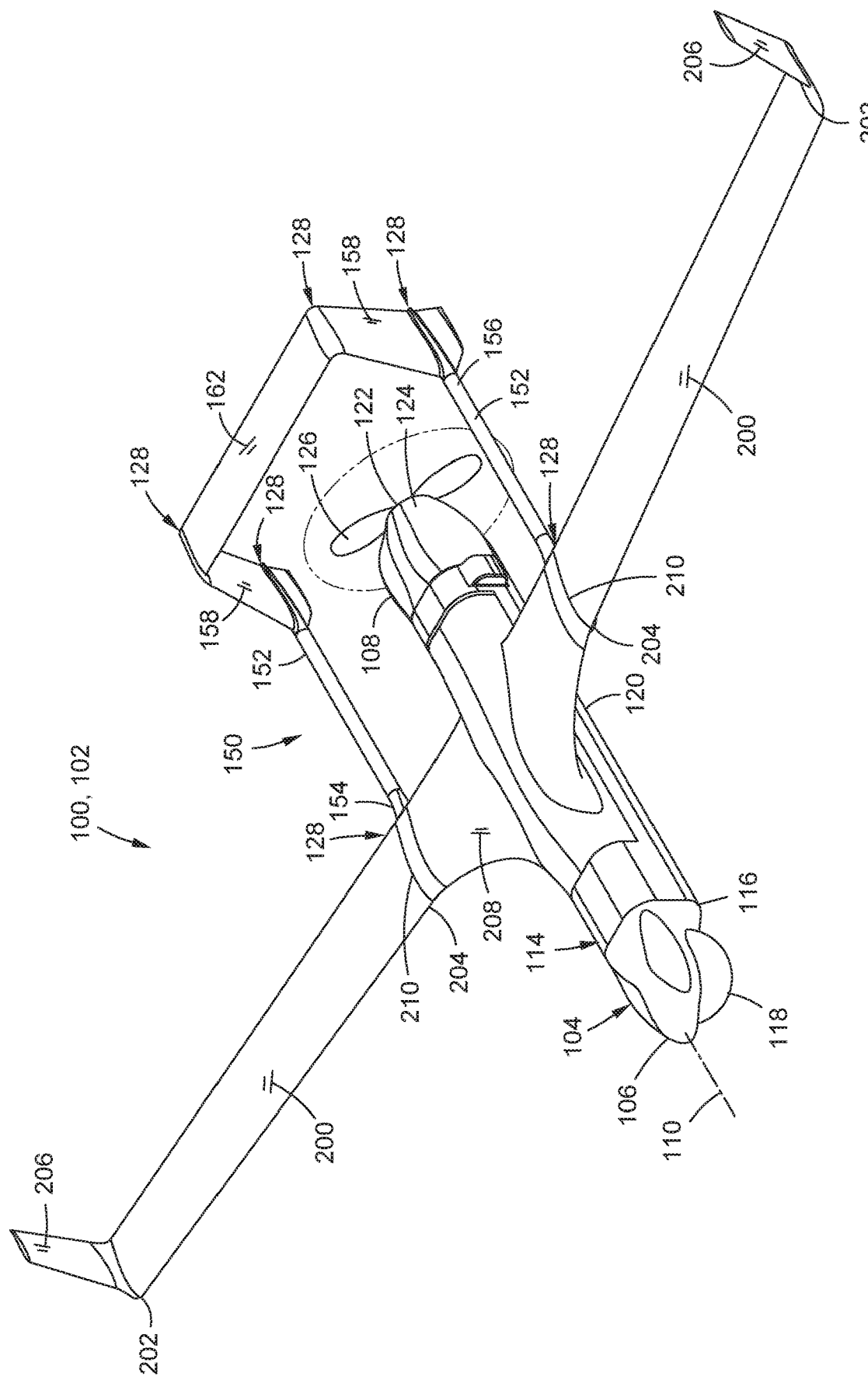
FIG. 1 is a perspective view of an example of an unmanned aerial vehicle (UAV) in an assembled state and wherein the UAV includes a fuselage module having a wing center portion to which are removably coupled a pair of wings and a pair of tail booms of an empennage.

Referring now to the drawings wherein the showings are for purposes of illustrating preferred and various embodiments of the disclosure, shown in FIG. 1 is a perspective view of an example of an aircraft 100 in a fixed-wing configuration provided as an unmanned aerial vehicle 102 (UAV) and shown in an assembled state. The UAV 102 may have a relatively small size and a low gross weight and is configured to be field assembled and disassembled into several lightweight components and/or modules that can be packed into one or more relatively small transport cases (not shown) to allow for shipping of the UAV 102 by land, sea, or air to any location. Once at the desired location, the components and/or modules may be quickly assembled using joining structure (not shown) and/or fastening mechanisms such as shear pins (not shown) and/or mechanical fasteners (not shown). For example, the UAV 102 includes a pair of wings 200 having male/female adapters (not shown) or joiner spars 214 (FIG. 2) for removably coupling the wings 200 respectively to opposite sides of a wing center portion 208 of a fuselage module 104 at a respective pair of field joints 128 (e.g., FIGS. 2-3).

Figure 2:
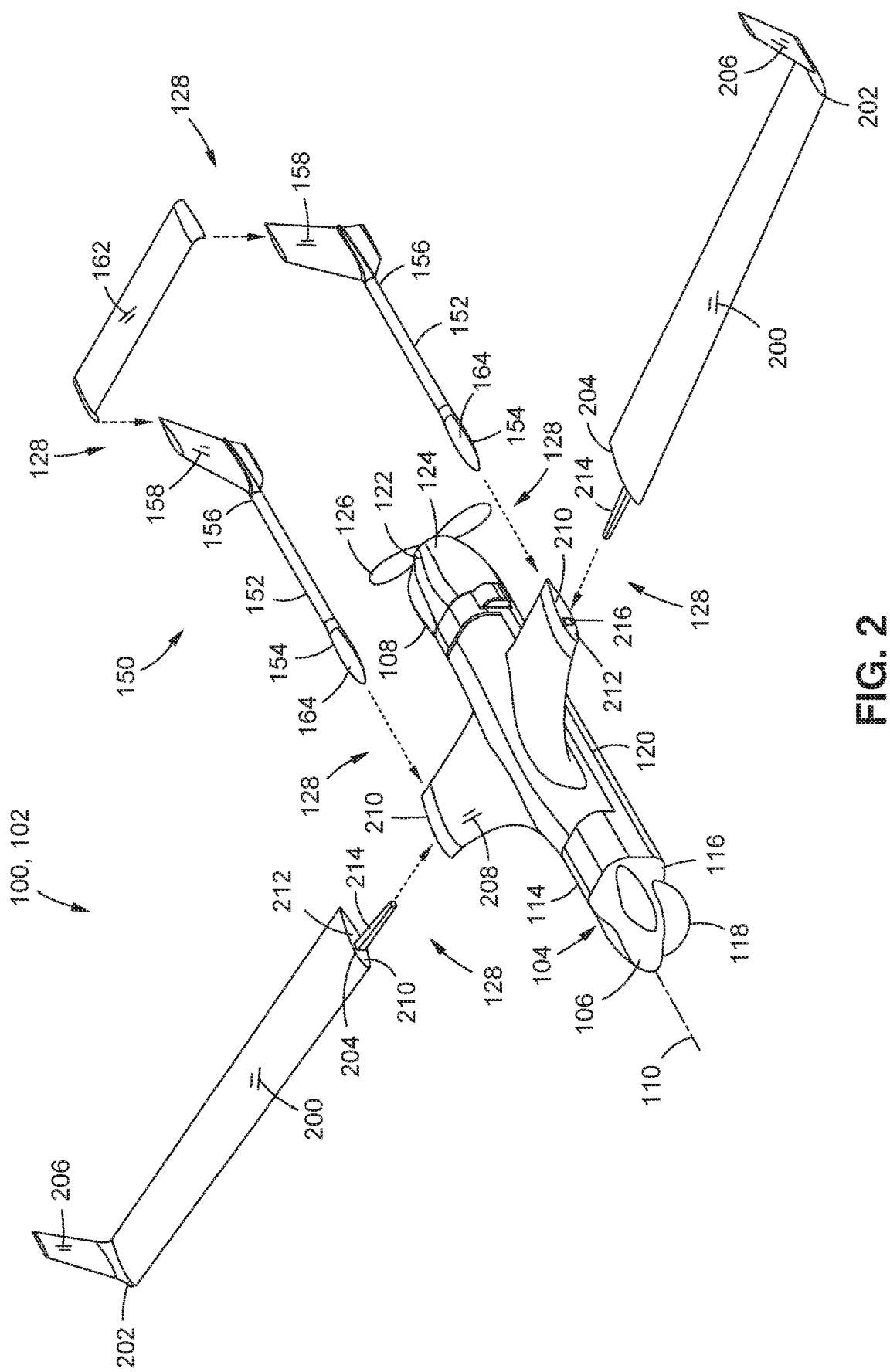
FIG. 2 is a perspective view of the UAV of FIG. 1 in a disassembled state showing the locations of field joints between the wing center portion and each one of the wings, and between the wing center portion and each one of the tail booms.
Figure 3:
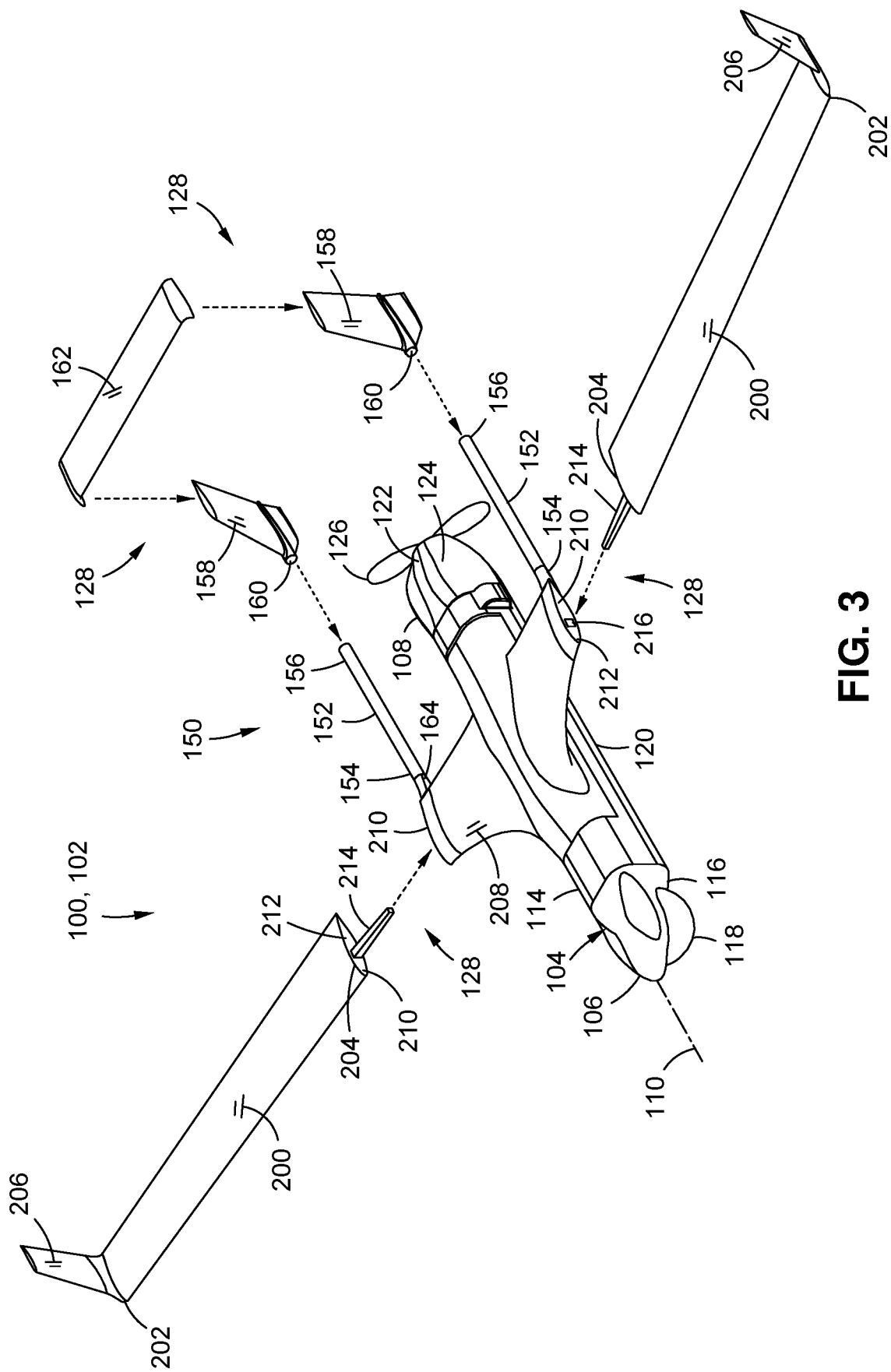
FIG. 3 is a perspective view of the UAV of FIG. 1 in a further example showing an alternative location of a field joint between each tail boom and a vertical tail of the empennage.

The UAV 102 also includes an empennage 150 configured to be coupled to the wing center portion 208 via a plurality of field joints 128 (e.g., FIGS. 2-3). After field assembly is complete, the UAV 102 of FIG. 1 may be launched as a fixed-wing aircraft using a portable catapult launcher (not shown) without the need for a dedicated runway. At the completion of a mission, the UAV 102 of FIG. 1 may be recovered using a portable recovery system (not shown). For example, the UAV 102 may fly into and latch onto a recovery cord (not shown) suspended from a mast (not shown) of the portable recovery system, thereby avoiding the need for a runway.

The UAV 102 of FIG. 1 is advantageously field-configurable for vertical takeoff and landing (VTOL) capability by field-assembling the aircraft 100 with vertical lift rotor modules 300 (e.g., FIG. 4) and by reconfiguring the empennage 150 to reflect the configuration shown in FIGS. 4-14 and described below. The vertical lift rotor modules 300 collectively support a plurality of rotor assemblies 302 each having at least one vertical lift rotor 304 (FIG. 4) driven by a vertical lift motor 306 (FIG. 4) to provide the UAV 102 with the option of VTOL capability while the wings 200 retain the operational capabilities of a fixed-wing aircraft. In any one of the configurations shown in FIGS. 4-14, the aircraft 100 is field-configurable back into the conventional fixed-wing configuration (i.e., without VTOL capability—FIG. 1) by field-removing the vertical lift rotor modules 300 and field-reassembling the empennage 150 to reflect the configuration shown in FIG. 1.

In a further embodiment shown in FIGS. 17-23, the UAV 102 of FIG. 1 may be field-configurable for vertical or near-vertical takeoff and landing capability by field-replacing the pair of wings 200 with a pair of gyrocopter modules 400 and by reconfiguring the empennage 150 as shown in FIGS. 17-23 and described in greater detail below. As shown in FIG. 17-23, each one of the gyrocopter modules 400 has a gyro rotor 406 supported on a wing stub 402 configured to be field-assembled to the wing center portion 208. Each gyro rotor 406 has a rotor hub 324 and a plurality of rotor blades 322 which may be freely-rotatable for generating vertical thrust. For example, the gyro rotors 406 may generate vertical thrust when the rotor plane tilt angle 321 (FIG. 21) of the rotor plane 320 (e.g., the plane of rotation of the rotor blades 322) is adjusted to a positive pitch angle after pre-rotation of the gyro rotors 406 via internal gyro motors 410 or external pre-rotator motors 412. In addition, the gyro rotors 406 generate vertical thrust in response to airflow passing through the gyro rotors 406 during forward movement of the aircraft 100 under propulsive power of the forward thrust module 122, as described in greater detail below. The configuration of FIGS. 17-23 is field-configurable back into the conventional fixed-wing configuration (FIG. 1) by field-replacing the pair of gyrocopter modules 400 with the pair of wings 200 and field-reassembling the empennage 150 to reflect the configuration shown in FIG. 1.

The UAV 102 of FIGS. 1-14 and 17-23 includes a fuselage module 104 having a fuselage body 114 and a wing center portion 208 mounted to the fuselage body 114. In some examples, the wing center portion 208 may be removably coupled to the fuselage body 114 at a wing-fuselage interface (not shown) which may be configured as a field joint 128 (not shown). The wing center portion 208 may be coupled to the fuselage body 114 in a manner that allows for adjustment of the forward-aft location of the wing center portion 208 relative to the fuselage body 114 to allow for a wide range of payload capabilities in different payload bays of the fuselage module 104, while maintaining the aircraft center-of-gravity (not shown) within a predetermined fore-aft range of the aircraft center-of-lift (not shown) without the need for ballast (not shown). The fuselage module 104 has a fuselage forward end 106 and a fuselage aft end 108 and defines a longitudinal axis 110. The fuselage body 114 is shown having a rounded-square cross-sectional shape along a portion of the length of the fuselage body 114. However, the fuselage body 114 may be provided in any one a variety of different cross-sectional shapes such as a cylindrical or oval cross-sectional shape.

Referring to FIGS. 1-14 and 17-23, the fuselage module 104 may include one or more payload bays for containing various payloads. For example, the fuselage module 104 may include a forward payload bay 116 located proximate the fuselage forward end 106 and a center payload bay 120 located generally underneath or below the wing center portion 208. The fuselage module 104 may also include one or more avionics bays (not shown). An imaging system 118 may be housed within the forward payload bay 116 and may include any one of a variety of different types of sensors such as infrared sensors and/or electro-optical sensors respectively for infrared imaging and/or visible light imaging. Alternatively or additionally, the imaging system 118 may include a still camera, a video camera, and any one a variety of sensors. In some examples, the fuselage module 104 may include a turret for housing one or more of the imaging devices and/or sensors.

As shown in FIGS. 1-14 and 17-23, the UAV 102 includes a forward thrust module 122 which may be removably couplable to the fuselage body 114 at the fuselage aft end 108 as shown. Alternatively, the forward thrust module 122 may be removably couplable to the fuselage forward end 106 (not shown), or the UAV 102 may include a forward thrust module 122 at both the fuselage forward end 106 and at the fuselage aft end 108. The forward thrust module 122 includes an engine 124 such as an internal combustion engine 124 for driving a propeller 126, although the propeller 126 may be driven by an electric motor. In some examples, each rotor assembly 302 may include dedicated batteries (not shown) for providing electrical power to the electric motor of the forward thrust module 122. In other examples, each electric motor may be powered by one or more batteries located in a center payload bay 120 of the fuselage module 104. Alternatively, the aircraft 100 may include a main power system (not shown) to provide power to the vertical lift motors 306 of the vertical lift rotor modules 300 when coupled to the aircraft 100, or a power module (not shown) may be assembled to the aircraft 100 when filed-configuring for VTOL capability (e.g., FIGS. 4-14). Alternatively, the engine 124 of the forward thrust module 122 may be a turbine engine for driving the propeller 126, or the engine 124 of the forward thrust module 122 may be a turbojet engine configured to provide forward thrust via jet propulsion.

The UAV 102 also includes the empennage 150 having a pair of tail booms 152 (e.g., a left boom and a right boom) configured to extend aftwardly from the wing center portion 208 on opposite sides of the fuselage body 114. The tail booms 152 may be generally hollow tubular structures having a length sufficient to provide longitudinal (e.g., pitch) stability for the UAV 102 within a wide range of center-of-gravity locations. When the UAV 102 is in the assembled state (e.g., FIGS. 1, 5-9, 11-14, and 18-23), each tail boom 152 may be oriented generally parallel to the longitudinal axis 110. The empennage 150 further includes a pair of vertical tails 158 configured to extend upwardly from the boom aft end 156 respectively of the pair of tail booms 152 for the UAV 102 configuration of FIG. 1. In the example shown, each vertical tail 158 may extend upwardly at an inwardly-canted angle (e.g., 10 degrees) relative to vertical. However, each vertical tail 158 may extend upwardly at any angle of between +45° and −45° relative to vertical. The empennage 150 includes a horizontal tail 162 extending between the free ends of the vertical tails 158. Each vertical tail 158 may include a fitting (not shown) having one or more threaded holes (not shown) or threaded receptacles (e.g., not shown) configured to receive one or more mechanical fasteners (not shown—bolts, screws, etc.) for removably coupling opposing sides of the horizontal tail 162 to the free ends of the pair of vertical tails 158.

Referring to FIGS. 2-3, shown are perspective views of the UAV 102 in a disassembled state showing the locations of field joints 128 for attaching the wings 200 to the wing center portion 208, and showing two different configurations by which the empennage 150 may be coupled to the wing center portion 208. For example, FIG. 2 shows a configuration of the empennage 150 in which the boom forward end 154 of each one of the tail booms 152 is configured to be removably coupled to the wing center portion 208 at a field joint 128 located at each of laterally opposite center portion sides 210 of the wing center portion 208. Each one of the tail booms 152 may be removably coupled to the wing center portion 208 at a field joint 128 using externally-accessible mechanical fasteners (not shown) to secure the tail boom 152 to the wing center portion 208. For example, the boom forward end 154 of each one of the tail booms 152 may include at least one forward-facing shear pin (not shown) configured to engage a shear pin bore (not shown) formed in a fitting (not shown) included with a wing rib 212 located on a laterally opposite side of the wing center portion 208. In addition, the boom forward end 154 or the wing center portion 208 may include a threaded hole (not shown) oriented approximately parallel to the tail boom 152 for receiving an externally-accessible mechanical fastener (e.g., an Allen screw) for positively securing the tail boom 152 to the wing center portion 208 during field assembly of the tail boom 152 to the aircraft 100 module. The combination of the shear pin and externally-accessible mechanical fastener and optional structural features (not shown) incorporated into the boom interface 164 may prevent movement of the tail boom 152 relative to the wing center portion 208. The vertical tails 158 in FIG. 2 are each fixedly coupled or non-removably attached to the boom aft end 156 of the tail booms 152. As mentioned above, the horizontal tail 162 extends between the free ends of the vertical tails 158 and may be removably couplable to the free ends at a pair of field joints 128.

FIG. 3 shows an alternative configuration of the empennage 150 in which the boom forward end 154 of each one of the tail booms 152 is fixedly coupled to the wing center portion 208, and the vertical tails 158 are each configured to be removably coupled to the boom aft end 156 of at a field joint 128. For example, each one of the vertical tails 158 may include a forward-extending boom segment 160 configured to be removably coupled to the boom aft end 156 at a field joint 128 using one or more externally-accessible mechanical fasteners (not shown) and or by using a sleeve fitting (not shown) configured to extend across and clamp onto (e.g., via mechanical fasteners) the boom aft end 156 and the boom segment 160. Also shown in each of FIGS. 2-3 is the horizontal tail 162 configured to be removably coupled to the vertical tails 158 at a pair of field joints 128 at the free ends respectively of the vertical tails 158.

In FIGS. 2-3, also shown are the field joints 128 for removably coupling the wings 200 to the wing center portion 208 proximate the laterally opposite center portion sides 210. Each wing 200 has a wing root 204 and a wing tip 202. The wing 200 may include a winglet 206 extending upwardly from the wing tip 202. Alternatively, the winglet 206 may extend downwardly (not shown) from the wing tip 202. Each wing 200 may be joined to the wing center portion 208 using joining structure and/or hardware. In the example shown, each wing 200 may include a joiner spar 214 protruding inwardly from the wing root 204. The wing center portion 208 may include a joiner spar pocket 216 formed in a wing rib 212 and configured to receive the joiner spar 214 for coupling the wing 200 to the wing center portion 208. Once the joiner spar 214 of a wing 200 is inserted into a joiner spar pocket 216, one or more externally-accessible mechanical fasteners (not shown) may be installed and/or manipulated in a manner to lock the wing 200 to the wing center portion 208. Removal of each wing 200 from the wing center portion 208 may be effected by removing or disengaging any externally-accessible mechanical fasteners installed during assembly of the wing 200 to the wing center portion 208, and sliding the joiner spar 214 out of the joiner spar pocket 216 as the wing 200 is separated from the wing center portion 208.

Figure 4:
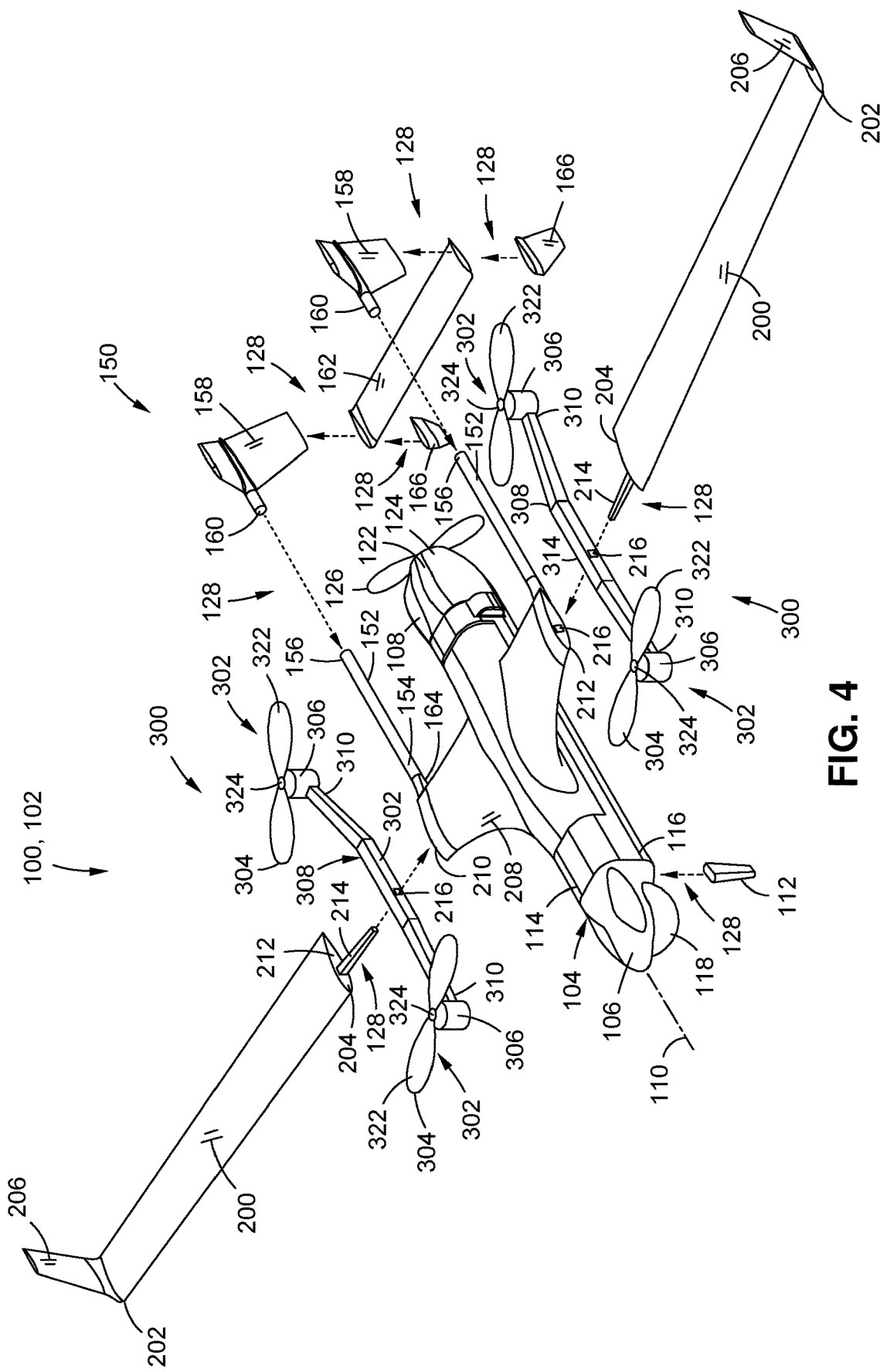
FIG. 4 is a perspective view of an example of a UAV in a disassembled state and having two (2) vertical lift rotor modules collectively supporting four (4) rotor assemblies, and wherein each one of the vertical lift rotor modules is configured to be removably coupled to the fuselage module at a field joint between a wing and the wing center portion
Figure 5:
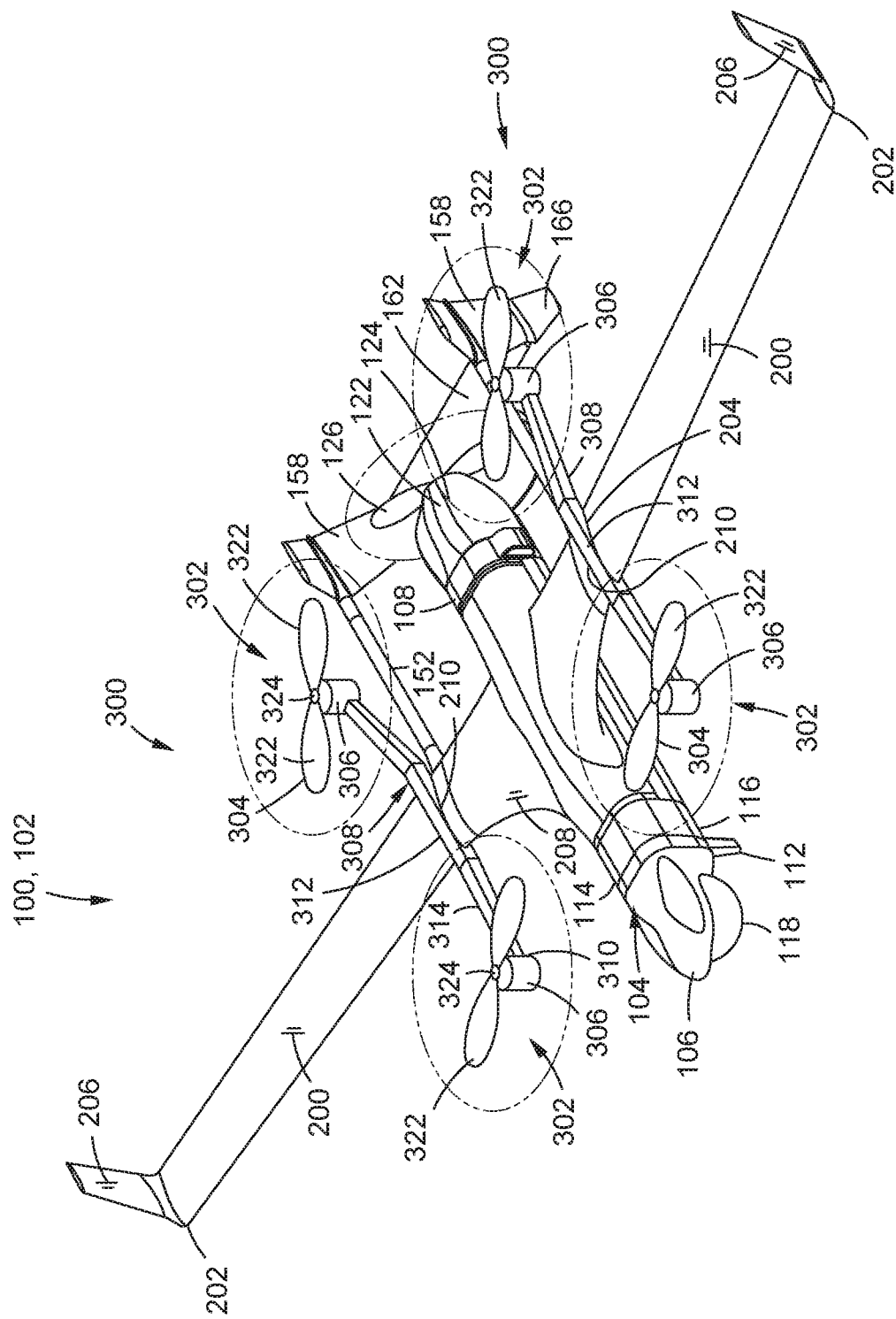
FIG. 5 is a top perspective view of the UAV of FIG. 4 in an assembled state.
Figure 6:
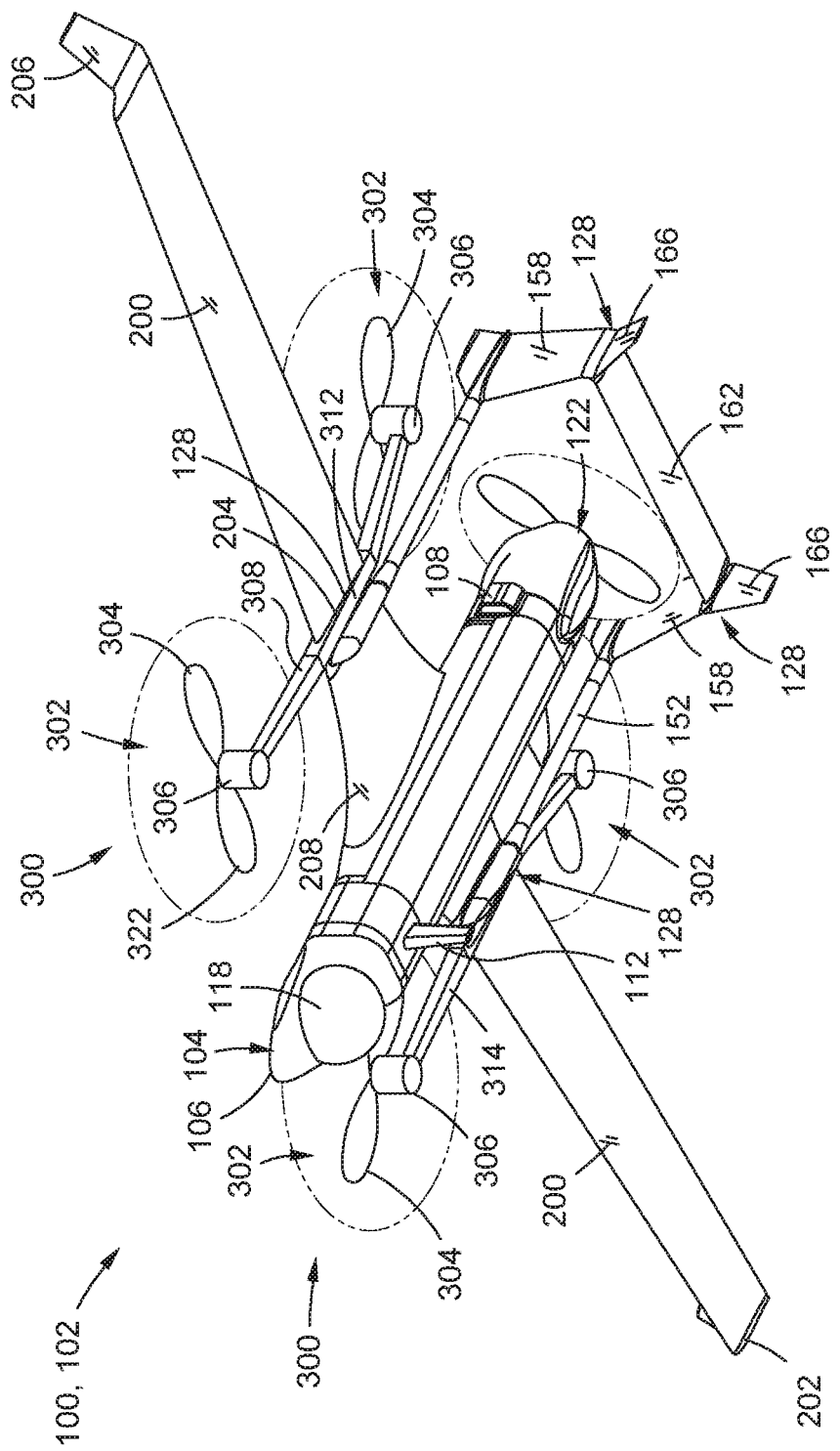
FIG. 6 is a bottom perspective view of the UAV of FIG. 4 in the assembled state.

Referring to FIGS. 4-6, shown in FIG. 4 is a perspective view of an example of a UAV 102 in a disassembled state. The UAV 102 has two (2) vertical lift rotor modules 300 collectively supporting four (4) rotor assemblies 302 enabling VTOL capability of the UAV 102. FIGS. 5-6 show the UAV 102 in an assembled state. In FIGS. 4-6, each rotor assembly 302 is supported by a rotor boom 308. As mentioned above, each rotor assembly 302 has at least one vertical lift rotor 304 driven by a vertical lift motor 306 fixedly mounted on a boom free end 310 of the rotor boom 308. In any one of the UAV 102 configurations disclosed herein, one or more of the vertical lift rotors 304 may be configured as counter-rotating rotors (not shown) driven by the vertical lift motor. Each vertical lift rotor 304 may include a rotor hub 324 and a plurality of rotor blades 322. The boom mounting portion 312 of each rotor boom 308 is configured to be removably coupled to the fuselage module 104 at the location of a field joint 128. In this regard, each rotor boom 308 is configured to be removably coupled to either the fuselage body 114 (FIGS. 10-14) or to one of laterally opposite center portion sides 210 of the wing center portion 208 of the fuselage module 104 (FIGS. 4-9).

In the example of FIGS. 4-9, the rotor booms 308 are configured as longitudinal rotor booms 314 each having a boom mounting portion 312 configured to be removably couplable to the wing center portion 208 proximate the center portion sides 210 using joining structure and/or hardware. For example, the boom mounting portion 312 of each longitudinal rotor boom 314 and a laterally opposite side of the wing center portion 208 may incorporate a male/female-type adapter (not shown) with cam pins (not shown) and cam pin receivers (not shown) to lock the boom mounting portion 312 to the wing center portion 208. In some examples, the boom mounting portion 312 of each longitudinal rotor boom 314 may be placed in direct contact with a wing root 204 of the wing 200 and with a laterally opposite sides of the wing center portion 208. In this manner, each one of the rotor booms 308 may be effectively clamped between the wing root 204 of a wing 200 and a laterally opposite side of the wing center portion 208. In another example, the joiner spar 214 protruding from the wing root 204 of each wing 200 may be extended through a joiner spar pocket 216 formed in the boom mounting portion 312 of the rotor boom 308 and into the joiner spar pocket 216 formed in a wing rib 212 on a laterally opposite side of the wing center portion 208, thereby capturing the boom mounting portion 312 between the wing root 204 and the wing center portion 208. As may be appreciated, the rotor booms 308 may be mechanically coupled to the wing center portion 208 using any one of a variety of joining structure and/or hardware such as pins, cams, threaded fasteners, and other types of coupling mechanisms.

In FIGS. 4-9, the longitudinal rotor booms 314 are shown oriented generally parallel to a longitudinal axis 110 of the fuselage body 114. When coupled to the wing center portion 208, a portion of each longitudinal rotor boom 314 extends forwardly from the wing center portion 208, and a portion of each longitudinal rotor boom 314 extends aftwardly from the wing center portion 208. The portion of the longitudinal rotor boom 314 extending forward of the wing center portion 208 is shown as being generally parallel to the tail boom 152, although the portion extending forwardly of the wing center portion 208 may be angled laterally outwardly, laterally inwardly, upwardly, and/or downwardly. The portion of the longitudinal rotor boom 314 extending aft of the wing center portion 208 is shown angled laterally outwardly from the tail boom 152, although the portion extending aft of the wing center portion 208 may be parallel to the tail boom 152, or is angled upwardly or downwardly. Although not shown, each one of the longitudinal rotor booms 314 may be provided in a straight configuration.

In FIGS. 4-9, each one of the longitudinal rotor booms 314 has an opposing pair of boom free ends 310 and a boom mounting portion 312 located between the boom free ends 310. Two of the rotor assemblies 302 are mounted respectively on the opposing boom free ends 310 of the longitudinal rotor boom 314. The rotor assemblies 302 may be identical to each other except for the direction of rotation of the vertical lift rotors 304. The two longitudinal rotor booms 314 may be configured as mirror images of each other. However, in an example not shown, the longitudinal rotor booms 314 may be identically configured. Although shown as having a square cross-sectional shape, the rotor booms 308 in any of the UAV examples disclosed herein may have a cross-sectional shape other than square, such as a circular cross-sectional shape. Each one of the rotor booms 308 may be hollow to reduce weight and to house one or more system lines such as power cables for providing electrical power to the vertical lift motors 306, electrical signal lines (e.g., electrical wiring) for controlling the operation of the vertical lift motors 306 and/or vertical lift rotors 304, and other types of system lines. Such system lines may have pass-through connectors and/or quick-release fittings at the boom attachment portion where each rotor boom 308 is coupled to the fuselage module 104.

Although FIG. 4-9 showing the UAV 102 in a configuration having a pair of vertical lift rotor modules 300 supporting a total of four (4) rotor assemblies 302, the UAV 102 may be configured to be field assembled with any number of vertical lift rotor modules 300 supporting any number of rotor assemblies 302. For example, a plurality of vertical lift rotor modules 300 may be configured to support a total of six (6) rotor assemblies 302, a total of eight (8) rotor assemblies 302, or any number of rotor assemblies 302. Preferably, the rotor assemblies 302 are arranged such that there are an equal number of rotor assemblies 302 on each lateral side of the fuselage body 114, and an equal number of rotor assemblies 302 forward of and aft of the wing center portion 208.

Referring to FIG. 6, shown is an underside of the UAV 102 of FIG. 4 illustrating the configuration of the empennage 150 in which the vertical tails 158 extend generally downwardly from the tail booms 152 when the vertical lift rotor modules 300 are coupled to the aircraft 100. In contrast, in the UAV 102 configuration of FIG. 1-3, the empennage 150 is configured in a manner such that the vertical tails 158 extend generally upwardly from the tail boom 152 when the vertical lift rotor modules 300 are omitted from the aircraft 100. In this regard, the field joints 128 by which the empennage 150 is assembled to the aircraft 100 may allow for selective orientation of the vertical tails 158 depending on whether the UAV 102 is to be operated as a conventional fixed-wing aircraft (e.g., FIGS. 1-3) or as an aircraft 100 having VTOL capability (e.g., FIGS. 4-14 and 17-23). Assembling the empennage 150 as shown in FIGS. 1-3 such that the vertical tails 158 extend upwardly results in the horizontal tail 162 being positioned at a relatively high location to avoid interfering with the launching hardware of a portable catapult launch (not shown). In contrast, assembling the empennage 150 to the configuration shown in FIG. 4-14 such that the vertical tails 158 extend downwardly prevents the propeller 126 of the forward thrust module 122 from contacting the ground. In addition, assembling the empennage 150 such that the vertical tails 158 extend downwardly allows the vertical tails 158 to support the aft end of the aircraft 100 on the ground during vertical or near-vertical takeoff and landing.

Referring to FIG. 4-14, the UAV 102 may include a pair of tail extensions 166 removably couplable (e.g., at field joints 128) to the pair of vertical tails 158. Each one of the tail extensions 166 may extend downwardly from a vertical tail 158 and may support the aft end of the aircraft 100 on a surface when the vertical lift rotor modules 300 are coupled to the aircraft 100. In addition two supporting the aircraft 100, the tail extensions 166 may increase the tail surface area for improving directional control and/or stability of the aircraft 100. Also shown in FIG. 4-14 is a nose support 112 that may be removably coupled to the fuselage module 104 for supporting a forward end of the aircraft 100. When installed, the nose support 112 may extend downwardly from the fuselage module 104. Although shown as being fixed in position, in some embodiments, the nose support 112 may be retractable into the fuselage body 114. The nose support 112 may have an aerodynamic cross-sectional shape to reduce aerodynamic drag during forward flight of the aircraft 100.

Figure 7:
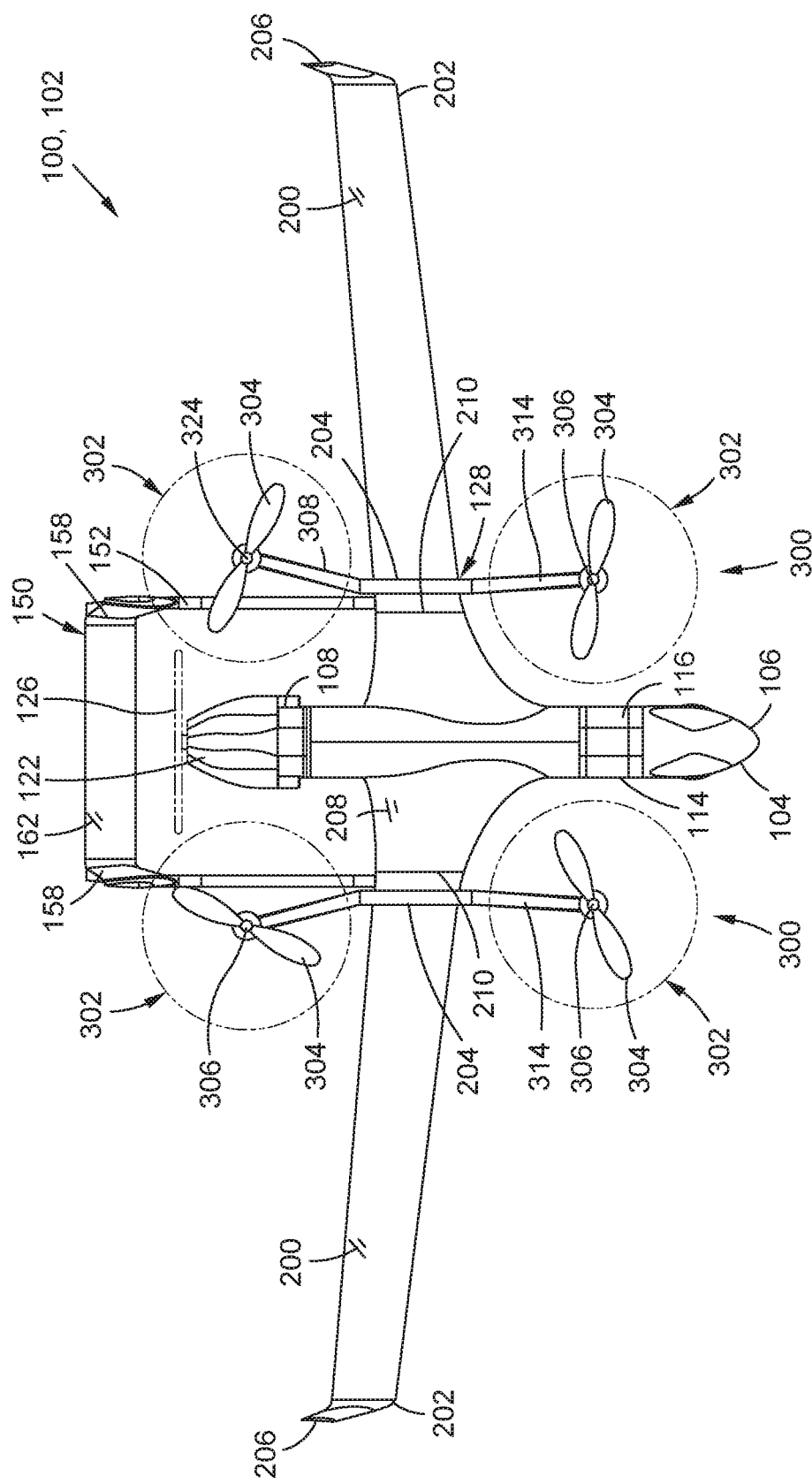
FIG. 7 is a top view of the UAV of FIG. 4 in the assembled state.

Referring to FIG. 7, shown is a top view of the UAV 102 of FIG. 4 in the assembled state. In the example shown, the vertical lift rotor modules 300 are configured such that when coupled to the wing center portion 208, a pair of the rotor assemblies 302 are located on each of laterally opposite sides of the fuselage body 114. The rotor assemblies 302 of each pair are respectively located forward of and aft of the wing center portion 208 resulting in a quad pattern including a left-front rotor, a right-front rotor, a left-rear rotor and a right-rear rotor. The left-front rotor and the right-rear rotor may be configured to rotate in the same direction as each other, and which may be opposite of the direction of rotation of the right-front rotor and the left-rear rotor. However, the vertical lift rotor modules 300 may be configured such that all of the vertical lift rotors 304 rotate in the same direction.

Referring to FIGS. 8-9, shown respectively are front and side views of the UAV 102 of FIG. 4-7 in the assembled state. In the example shown, the vertical lift rotor modules 300 are configured such that when coupled to the wing center portion 208, the rotor plane 320 of the vertical lift rotors 304 is higher than the wing upper surface when the aircraft 100 is viewed from the end or from the side. Configuring the vertical lift rotor modules 300 such that the vertical lift rotors 304 are at a higher elevation than the wing upper surface may reduce the amount of disruption of the airflow passing over the wings 200 during forward flight of the UAV 102.

In an embodiment not shown, the vertical lift rotor modules 300 may be provided in a configuration having a total of four (4) longitudinal rotor booms 314 each having a boom free end 310 and a boom mounting portion 312. The boom mounting portion 312 of each longitudinal rotor boom 314 may be configured to be independently removably coupled to the wing center portion 208 proximate one of the laterally opposite center portion sides 210. For example, the boom free end 310 of each one of the longitudinal rotor booms 314 may be directly coupled to the wing center portion 208. The four (4) longitudinal rotor booms 314 may be mounted in a manner such that on each of laterally opposite center portion sides 210 of the wing center portion 208, one of the longitudinal rotor booms 314 extends in a forward direction from the wing center portion 208, and one of the longitudinal rotor booms 314 extends in an aft direction from the wing center portion 208. The boom free end 310 of each one of the longitudinal rotor booms 314 may each support a rotor assembly 302 including a vertical lift motor 306 and a vertical lift rotor 304. For a UAV 102 having four (4) individual longitudinal rotor booms 314, the pair of wings 200 may be configured to be removably coupled in direct contact respectively with the laterally opposite center portion sides 210 of the wing center portion 208, similar to the arrangement shown in FIGS. 2-3 wherein each wing 200 has a joiner spar 214 configured to be inserted into a joiner spar pocket 216 formed in the wing center portion 208.

Figure 10:
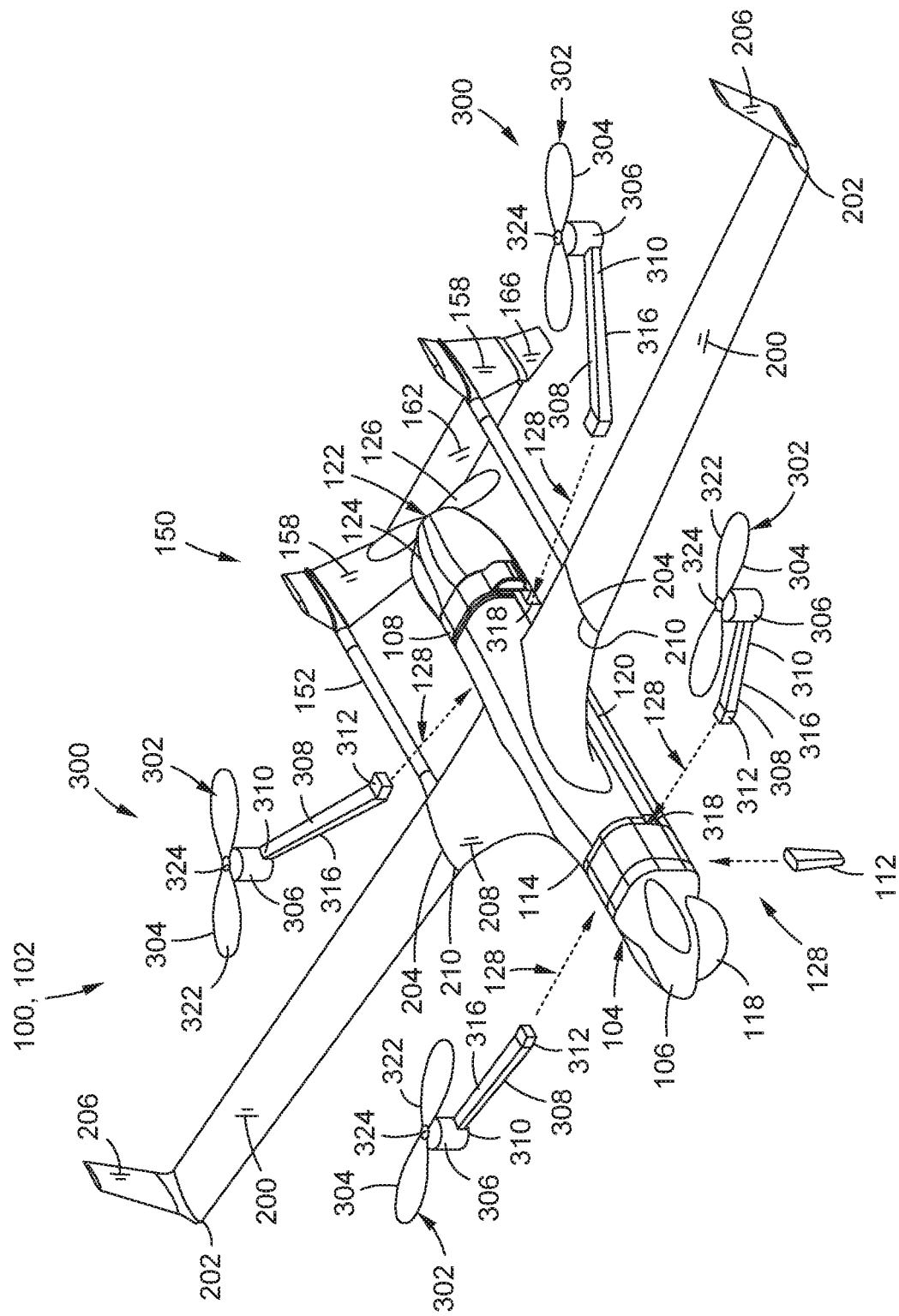
FIG. 10 is a perspective view of an example of a UAV in a partially-disassembled state showing four (4) vertical lift rotor modules each removably couplable to the fuselage module at four (4) corresponding field joints.
Figure 11:
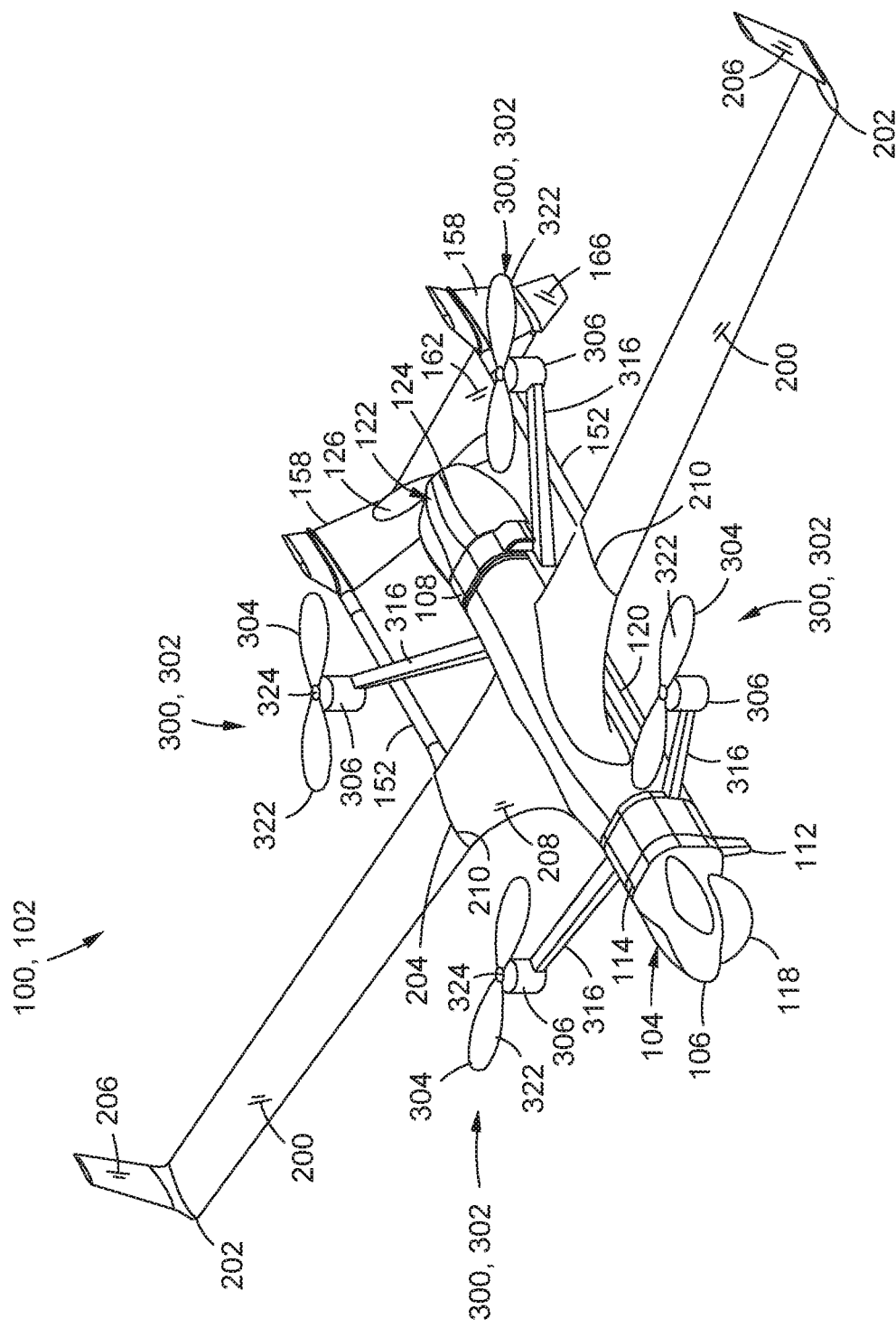
FIG. 11 is a top perspective view of the UAV of FIG. 10 in an assembled state.

Referring now to FIGS. 10-14, shown is a UAV 102 embodiment in which the rotor booms 308 are configured as transverse rotor booms 316 oriented non-parallel to the longitudinal axis 110 of the fuselage body 114. FIG. 10 shows the UAV 102 in a partially disassembled state in which the transverse rotor booms 316 are uncoupled from the fuselage body 114, and the wings 200 are shown coupled to the wing center portion 208 at the pair of field joints 128 on the laterally opposite center portion sides 210. In addition, the empennage 150 is shown assembled to the UAV 102. The wings 200 may be removably couplable to the wing center portion 208 in a manner similar to the wing attachment configuration shown in FIGS. 2-3 and described above. The empennage 150 may be assembled at a plurality of field joints 128 in the manner shown in FIG. 4 and described above. The tail extensions 166 may be assembled to the vertical tails 158 as shown in FIG. 4. The nose support 112 may be removably coupled to the fuselage body 114 as shown in FIGS. 10-11 and described above with regard to FIG. 4-5.

FIG. 10 illustrates four (4) vertical lift rotor modules 300 each removably coupled to the fuselage module 104 at four (4) corresponding field joints 128. Each one of the transverse rotor booms 316 has a boom free end 310 and a boom mounting portion 312. The boom free end 310 of each transverse rotor boom 316 may support a rotor assembly 302 including a vertical lift motor 306 for rotatably driving a vertical lift rotor 304 described above. The boom mounting portion 312 of each one of the transverse rotor booms 316 is configured to be independently coupled to the fuselage body 114 at a field joint 128. In the example shown, the boom mounting portion 312 of each transverse rotor boom 316 may be configured to be inserted into a rotor boom socket 318. However, the boom mounting portion 312 of each transverse rotor boom 316 may be coupled to the fuselage body 114 in any one a variety of different means such as with boom attachment structure (not shown) or hard points (not shown) incorporated into the fuselage body 114 and/or by the use of shear pins, externally-accessible mechanical fasteners, or any one a variety of attachment mechanisms.

Figure 12:
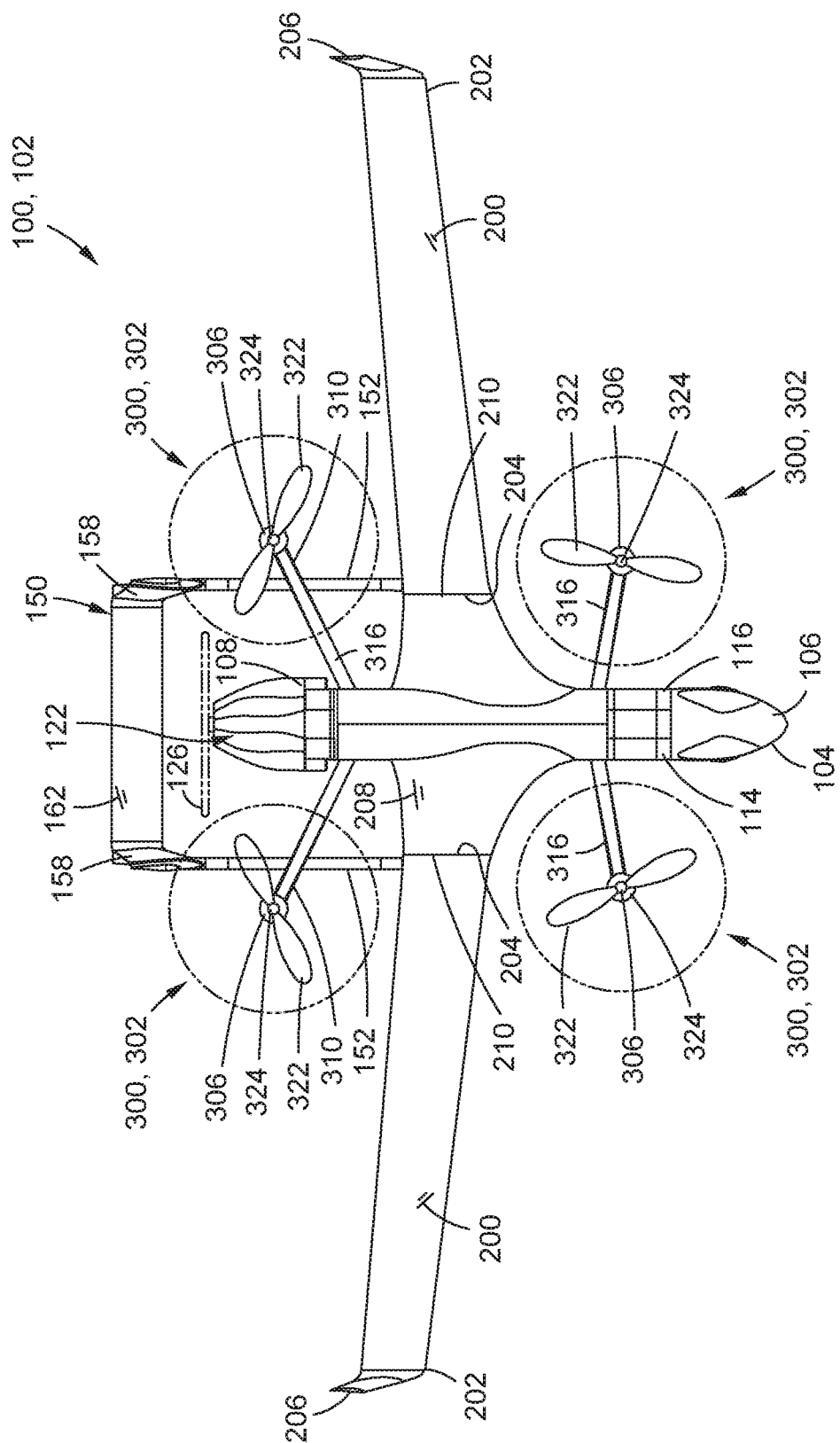
FIG. 12 is a top view of the UAV of FIG. 10 in the assembled state.

FIG. 11 shows the UAV 102 of FIG. 10 in an assembled state showing the transverse rotor booms 316 extending laterally outwardly from the fuselage body 114 along a direction non-parallel to the longitudinal axis 110 of the fuselage body 114. Each one of the transverse rotor booms 316 is shown extending upwardly from the boom mounting portion 312. As shown in FIG. 12, the transverse rotor booms 316 that are located forward of the wing center portion 208 are shown angled forwardly. The transverse rotor booms 316 that are located aft of the wing center portion 208 are shown angled aftwardly. The rotor assemblies 302 of the UAV 102 configuration of FIG. 10-14 are in the same relative location as the rotor assemblies 302 of the UAV 102 configuration of FIG. 4-9.

Figure 13:
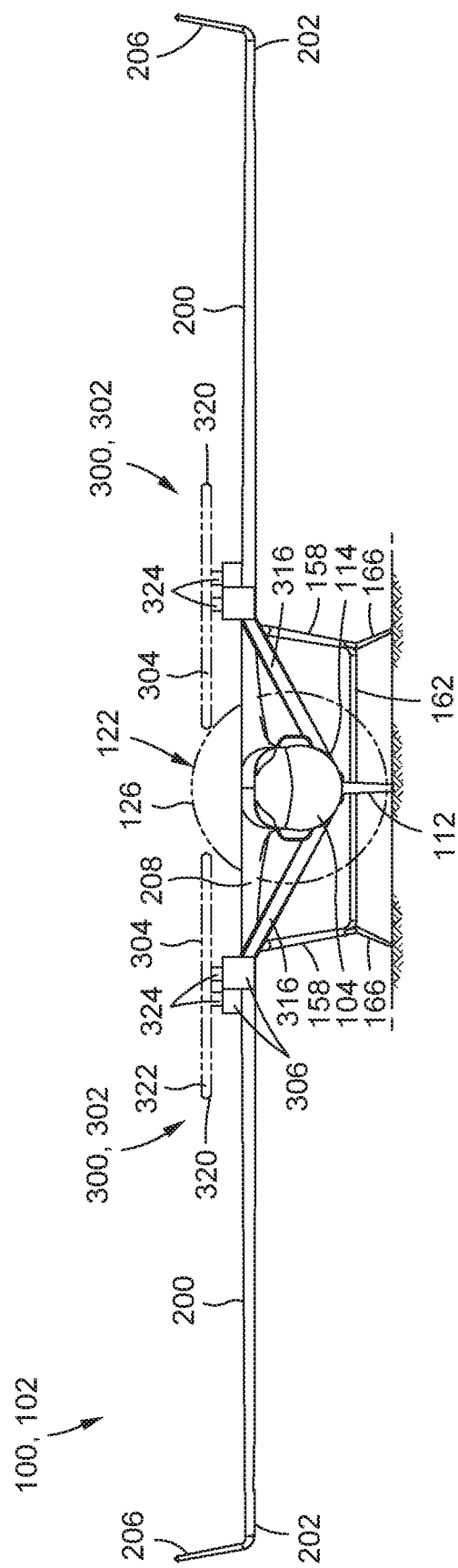
FIG. 13 is a front view of the UAV of FIG. 10 in the assembled state.
Figure 14:
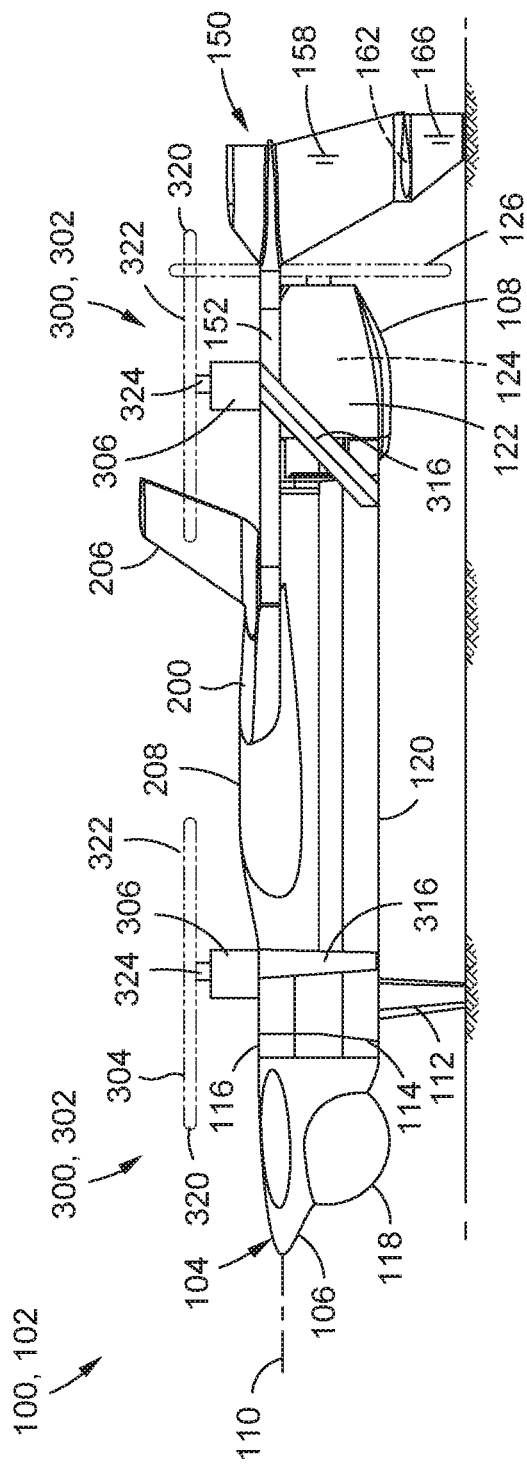
FIG. 14 is a side view of the UAV of FIG. 10 in the assembled state.

FIGS. 13-14 are respectively front and side views of the UAV 102 of FIG. 10 in the assembled state. The transverse rotor booms 316 are configured such that when coupled to the fuselage body 114, the rotor plane 320 of the vertical lift rotors 304 is higher than the wing 200 upper surface when the aircraft 100 is view from the end or from the side. With the exception of the transverse rotor booms 316, the UAV 102 configuration of FIGS. 10-14 may be configured substantially similar to the UAV 102 configuration of FIG. 4-9 as described above, and may have the same or similar functional capability as described herein. For example, the UAV 102 configuration of FIG. 10-14 includes field joints 128 allowing the empennage 150 to be assembled to the fuselage module 104 in a manner such that the vertical tails 158 are oriented downwardly. In addition, a tail extension 166 may be removably coupled to each one of the vertical tails 158 to support the aft end of the aircraft 100, and a nose support 112 may be removably coupled to the fuselage body 114 to support the forward end of the aircraft 100.

Referring to FIG. 15 with additional reference to FIGS. 4-9, shown in FIG. 15 is a flowchart of a method 500 of assembling a UAV 102 having vertical lift rotor modules 300. Step 502 of the method 500 includes removably coupling at least two vertical lift rotor modules 300 to the aircraft 100 by removably coupling a boom mounting portion 312 of a rotor boom 308 of each vertical lift rotor module 300 to a fuselage module 104 of the aircraft 100. In the example of FIG. 4-14 described above, the vertical lift rotor modules 300 collectively support four (4) rotor assemblies 302. Each rotor assembly 302 is supported by a rotor boom 308 having a boom mounting portion 312 and at least one boom free end 310. As described above and illustrated in FIGS. 7 and 12, the vertical lift rotor modules 300 are configured such that when coupled to the fuselage module 104, a pair of the rotor assemblies 302 are located on each of laterally opposite sides of the fuselage body 114. In addition, the rotor assemblies 302 of each pair are respectively located forward of and aft of the wing center portion 208 of the fuselage module 104.

For the UAV 102 embodiment in which the rotor booms 308 are configured as longitudinal rotor booms 314 oriented generally parallel to the longitudinal axis 110 of the fuselage body 114, step 502 of removably coupling the vertical lift rotor modules 300 to the aircraft 100 comprises removably coupling the boom mounting portion 312 of each longitudinal rotor boom 314 to the wing center portion 208 in a manner such that the longitudinal rotor booms 314 extend generally forwardly and aftwardly from the wing center portion 208. For the UAV 102 configuration having a total of two (2) longitudinal rotor booms 314 as shown in FIG.

4-9, the boom mounting portion 312 of each longitudinal rotor boom 314 is located between an opposing pair of boom free ends 310. Each one of the boom free ends 310 supports a rotor assembly 302. The step of removably coupling the boom mounting portion 312 of each rotor boom 308 to the wing center portion 208 comprises removably coupling the boom mounting portion 312 of each one of the pair of longitudinal rotor booms 314 to one of opposing center portion sides 210 of the wing center portion 208 at the location of a field joint 128. In one example, the boom mounting portion 312 may be placed in direct physical contact with the one of the center portion sides 210 of the wing center portion 208. Although not shown, each boom mounting portion 312 may be secured to a center portion side 210 by means of shear pins, mechanical fasteners, and/or other hardware or structure. In any one of the examples disclosed herein, once the rotor booms 308 are assembled to the aircraft 100, the rotor booms 308 may be non-movably fixed in position until disassembled from the aircraft 100.

After securing the longitudinal rotor booms 314 to the wing center portion 208, the method may include step 504 of removably coupling the pair of wings 200 respectively to the laterally opposite center portion sides 210 of the wing center portion 208 via the boom mounting portion 312 of the pair of horizontal rotor booms 308. For example, the joiner spar 214 of each wing 200 may be extended through a joiner spar pocket 216 formed in the boom mounting portion 312, after which the joiner spar 214 is inserted into the joiner spar pocket 216 formed in the wing rib 212 of the wing center portion 208. However, the wings 200 may be secured to the wing center portion 208 by alternative means, and are not limited to using joiner spars 214.

In an embodiment not shown, the longitudinal rotor booms 314 may comprise a total of four (4) individual longitudinal rotor booms 314. In such an arrangement, the step of removably coupling the boom mounting portion 312 of each rotor boom 308 to the wing center portion 208 may include removably coupling the boom mounting portion 312 of each one of a total of four (4) longitudinal rotor booms 314 to the wing center portion 208 proximate one of the laterally opposite center portion sides 210 of the wing center portion 208. Each one of the four (4) longitudinal rotor booms 314 may be directly physically engaged with the wing center portion 208 at a field joint 128 in a manner such that on each of the laterally opposite center portion sides 210, one of the longitudinal rotor booms 314 extends in a forward direction and one of the longitudinal rotor booms 314 extends in an aft direction. In some examples, the boom mounting portion 312 of each longitudinal rotor boom 314 may be secured to the wing center portion 208 at a field joint 128 location that allows the pair of wings 200 to be removably coupled to the laterally opposite center portion sides 210 of the wing center portion 208 in the manner shown in FIGS. 2-3.

Referring to FIGS. 10-14 showing the UAV 102 configuration having transverse rotor booms 316, the step of removably coupling the boom mounting portion 312 of each rotor boom 308 to the wing center portion 208 comprises removably coupling the boom mounting portion 312 of each transverse rotor boom 316 to the fuselage body 114 in a manner such that each one of the transverse rotor booms 316 extends laterally outwardly from the fuselage body 114 along a direction non-parallel to the longitudinal axis 110 of the fuselage body 114. For the example UAV 102 shown in FIG. 10, the transverse rotor booms 316 comprise a total of four (4) transverse rotor booms 316 each having a boom free end 310 and a boom mounting portion 312. In an embodiment not shown, the four (4) individual transverse rotor booms 316 may be identically configured and may each support a rotor assembly 302. The step of removably coupling the boom mounting portion 312 of each transverse rotor boom 316 to the fuselage body 114 comprises coupling two (2) transverse rotor beams to each of laterally opposite sides of the fuselage body 114 at a location forward of the wing center portion 208, and coupling a remaining two (2) transverse rotor beams to laterally opposite sides of the fuselage body 114 at a location aft of the wing center portion 208, as shown in FIG. 10-14. Each one of the transverse rotor booms 316 may be independently removably couplable to the fuselage body 114 at a field joint 128. For example, they boom mounting portion 312 of each transverse rotor boom 316 may be inserted into a rotor boom socket 318 incorporated into the fuselage body 114. Alternatively or additionally, the boom mounting portion 312 of each transverse rotor boom 316 may be engaged to a pair of structural hardpoints (not shown) on laterally opposite sides of the fuselage module 104 at each of the fuselage forward end 106 and the fuselage aft end 108.

In a UAV 102 configuration not shown, the transverse rotor booms 316 may comprise a total of two (2) transverse rotor booms 316 each having an opposing pair of boom free ends 310 and a boom mounting portion 312 located between the boom free ends 310. Such a transverse rotor boom 316 may be oriented generally perpendicularly relative to the longitudinal axis 110. For example, each one of the transverse rotor booms 316 may extend across a top of the fuselage body 114 at a location forward of the wing center portion, and another one of the transverse rotor booms 316 may extend across a top of the fuselage body 114 at a location aft of the wing center portion 208. The step of removably coupling the boom mounting portion 312 of each of the two (2) transverse rotor boom 316 to the fuselage body 114 may include removably coupling (e.g., at pair of field joints 128) one of the two (2) transverse rotor booms 316 to the fuselage body 114 at a location forward of the wing center portion 208 such as proximate the fuselage module 104 forward, and removably coupling (e.g., at another pair of field joints 128) a remaining one of the two (2) transverse rotor booms 316 to the fuselage body 114 at a location aft of the wing center portion 208 such as proximate the fuselage aft end 108.

For the UAV 102 configuration of FIG. 10-14, the method 500 may include removably coupling the pair of wings 200 to the wing center portion 208 in the manner shown in FIGS. 2-3 and described above. For example, the joiner spar 214 of each one of the wings 200 may be inserted into a joiner spar pocket 216 formed in each one of the laterally opposite sides of the wing center portion 208, as described above. In this regard, each one of the wings 200 may be placed in direct physical contact respectively with the wing center portion 208.

In any one of the UAV 102 configurations shown in FIG. 4-14, the method 500 includes removably coupling the empennage 150 to the wing center portion 208. For example, FIG. 4 illustrates an arrangement in which the pair of vertical tails 158 are removably coupled to the boom aft end 156 of a pair of tail booms 152. As mentioned above, the boom forward end 154 of each one of the tail booms 152 may be fixedly (e.g., non-removably) coupled to the wing center portion 208 as shown in FIG. 3-14. The boom aft end 156 of each one of the tail booms 152 may be coupled to a boom segment 160 that may protrude forwardly from each one of the vertical tails 158. An external or internal sleeve fitting (not shown) may splice together the boom aft end 156 and the boom segment 160 in order to secure the vertical tail 158 to the tail boom 152. However, the vertical tail 158 may be secured to the tail boom 152 in any one a variety of different arrangements, and is not limited to using a sleeve fitting. In the embodiment of FIG. 2, the empennage 150 may be configured such that the boom forward end 154 of each one of the pair of tail booms 152 is removably coupled to the wing center portion 208 at a respective pair of field joints 128. In such an arrangement, the tail boom 152 may be configured to enable coupling of the boom forward end 154 to the wing center portion 208 such that the vertical tail 158 extends either upwardly (e.g., FIGS. 1-3) or downwardly (e.g., FIGS. 4-14).

In this regard, when the vertical lift rotor modules 300 are omitted from the aircraft 100, the method 500 includes attaching the empennage 150 in a manner such that each one of the vertical tails 158 extends upwardly from the tail boom 152. When the vertical lift rotor modules 300 are coupled to the aircraft 100, the method includes attaching the empennage 150 in a manner such that each one of the vertical tails 158 extends downwardly from the tail boom 152. When the vertical tails 158 extend downwardly from the tail boom 152, the method may include removably coupling a tail extension 166 to each vertical tail 158 for supporting the aft end of the aircraft 100 on a surface. In addition, when the vertical lift rotor modules 300 are coupled to the aircraft 100, the method may include removably coupling a nose support 112 to the fuselage forward end 106 of the aircraft 100 for supporting the forward end of the aircraft 100. The method may include additional operations that are performed when the vertical lift rotor modules 300 are coupled to the aircraft 100. For example, the method may include installing batteries (not shown) or a power module (not shown) in one or more of the payload bays of the fuselage module 104 for providing electrical power to the vertical lift motors 306 of the vertical lift rotor modules 300.

Regardless of whether the boom forward end 154 is removably coupled (FIG. 2) or fixedly coupled (FIGS. 3-4) to the wing center portion 208, the empennage 150 may be configured to be field-assembled such that the vertical tails 158 extend downwardly from the tail booms 152 when the UAV 102 is in a VTOL configuration as shown in FIGS. 4-14, and the empennage 150 may be field-assembled such that the vertical tails 158 extend upwardly from the tail booms 152 when the UAV 102 is in a conventional fixed-wing configuration as shown in FIGS. 1-3. The method further includes removably coupling the horizontal tail 162 to pair of vertical tails 158 for interconnecting the vertical tails 158, as shown in FIG. 4 and described above.

Figure 16:
FIG. 16 is a flowchart of a method of operating a UAV having vertical lift rotor modules.

FIG. 16 is a flowchart of a method 600 of improving the operation of an aircraft 100 having vertical lift rotor modules 300. As described above, the aircraft 100 is field-configurable as either a VTOL-capable aircraft 100 (i.e., FIGS. 4-14) or as a conventional fixed-wing aircraft without VTOL capability (e.g., FIG. 1-3). The present method 600 discloses operation of the aircraft 100 having VTOL capability.

Step 602 of the method 600 includes performing a vertical takeoff and enabling operation of the aircraft 100 in hover flight. Vertical takeoff may be described as vertically lifting the aircraft 100 off of the surface (e.g., the ground, a road, a ramp, a runway, a ship deck, a platform) with no forward motion of the aircraft 100 (e.g., relative to the ground) prior to takeoff of the aircraft 100. The aircraft 100 may be configured to operate in hover flight during which the vertical lift rotor modules 300 are capable of at least maintaining the aircraft 100 at a substantially constant altitude using at least four rotor assemblies 302 supported by at least two vertical lift rotor modules 300 removably coupled (via field joints 128) to the fuselage module 104 of the aircraft 100. As described above, the vertical lift rotor modules 300 are configured such that when coupled to the fuselage module 104 via the rotor booms 308, a pair of the rotor assemblies 302 are located on each of laterally opposite sides of the fuselage body 114, and the rotor assemblies 302 of each pair are respectively located forward of and aft of the wing center portion 208.

As mentioned above, the aircraft 100 includes a pair of wings 200 removably coupled to the wing center portion 208 of the fuselage module 104 at the pair of field joints 128 on laterally opposite center portion sides 210. The wings 200 may generate aerodynamic lift when the aircraft 100 is propelled forward by the forward thrust module 122. In some examples, the wings 200 may be configured to generate an amount of aerodynamic lift sufficient to maintain level flight of the aircraft 100 at a desired operating altitude for the following conditions: (1) when the vertical lift rotor modules 300 are not coupled to the aircraft 100 (e.g., FIGS. 1-3), and (2) when the vertical lift rotor modules 300 are coupled to the aircraft 100 (e.g., FIGS. 4-14) and the vertical lift rotors 304 are non-rotating and/or are not generating vertical thrust. However, in other examples, the wings 200 may be configured to generate an amount of aerodynamic lift sufficient to maintain level flight of the aircraft 100 at the desired operating altitude only in combination with vertical thrust generated by the vertical lift rotors 304. The desired operating altitude of the aircraft 100 may be described as the maximum altitude of the aircraft 100 when configured as a conventional fixed-wing aircraft 100 (e.g., FIG. 1).

In some examples, the method of operating the aircraft 100 may include operating the engine 124 of the forward thrust module 122 at a relatively low rotational speed (e.g., at idle speed) to confirm nominal operation of the engine 124 prior to vertical takeoff of the aircraft 100. During vertical takeoff, the aircraft control system (e.g., onboard system or autopilot—not shown) may be configured to adjust the pitch of the rotor blades 322 to compensate for any disturbances caused by forward thrust of the forward propulsion module during vertical ascent of the aircraft 100. Alternatively, the pitch of the rotor blades 322 may be manually controlled via remote control.

Referring still to FIG. 16, the method 600 of operating the aircraft 100 may include step 604 of transitioning the aircraft 100 from hover flight to forward flight when the aircraft 100 has ascended to a desired altitude. In the present disclosure, hover flight may be described as flight during which the mass of the aircraft 100 is supported solely by the vertical thrust generated by the rotor assemblies 302. Transitioning the aircraft 100 from hover flight to forward flight may include controlling the rotor assemblies 302 and tilting the aircraft 100 into a nose-down orientation (not shown) in a manner to achieve forward movement of the aircraft 100 at least at a forward airspeed at which the wings 200 are capable of supporting the mass of the aircraft 100 in at least level flight without the assistance of vertical thrust from the four rotor assemblies 302. In an embodiment, the airspeed at which the wings 200 are capable of supporting the aircraft 100 may an airspeed of at least approximately 70 percent of a cruising speed of the aircraft 100 when configured as a conventional fixed-wing aircraft 100 (FIG. 1-3).

Transitioning from hover flight to forward flight may further include stopping rotation of the vertical lift rotors 304 (e.g., manually by remote control or via autopilot) while increasing forward thrust of the forward thrust module 122 such as by increasing (e.g., from idle) a rotational speed of the propeller 126 of the forward thrust module 122. The transition from hover flight to forward flight may further include allowing the forward end of the aircraft 100 to drop into a nose-down orientation, causing the aircraft 100 to dive in a stable weathervane maneuver and resulting in an increase in the forward airspeed under increased power (e.g., applied manually or via autopilot) of the forward thrust module 122. The airspeed may be increased until achieving the forward airspeed at which the wings 200 generate an amount of aerodynamic lift capable of maintaining the aircraft 100 in level flight. In some examples, the aircraft 100 may be maintained in level flight by a combination of aerodynamic lift generated by the wings 200 and vertical thrust generated by the vertical lift rotors 304. The transition from hover flight to forward flight may be performed under control of an auto-pilot or by preprogramming an existing control system of the aircraft 100 to achieve a smooth transition.

Referring still to FIG. 16, the method 600 of operating the aircraft 100 may include step 606 of transitioning the aircraft 100 from forward flight to landing. The transition from forward flight to landing may include transitioning from forward flight to hover flight, and may involve flying the aircraft 100, under power of the forward thrust module 122, into proximity over or directly above a landing zone (not shown). In addition, the transition from forward flight to landing may include activating the rotor assemblies 302 and/or increasing the rotational speed of the vertical lift rotors 304 to generate an amount of vertical thrust capable of supporting the aircraft 100 in hover flight. The transition may further include reducing forward thrust of the forward thrust module 122 such as reducing to idle speed (e.g., manually by remote control or via autopilot) the rotational speed of the propeller 126 of the forward thrust module 122. In some examples, the transition may optionally include stopping the engine 124 of the forward thrust module 122 when the aircraft 100 is within a predetermined altitude (e.g., less than 10 feet) above the surface of the landing zone to avoid unintentionally moving the aircraft 100 out of the desired landing zone. Alternatively, the engine 124 may remain running until after touchdown. The transition may additionally include controlling the rotational speed of the vertical lift rotors 304 to reduce the altitude of the aircraft 100 until landing vertically on the surface, at which point the engine 124 of the forward thrust module 122 may be turned off. In some examples, a vertical landing may be performed with substantially no horizontal movement of the aircraft 100 as may otherwise be caused by forward thrust from the forward thrust module 122. During vertical takeoff and/or landing of the aircraft 100, the method may include supporting the aircraft 100 on the nose support 112 and the pair of vertical tails 158 or tail extensions 166 as shown in FIGS. 8-9 and 13-14.

During operation of the aircraft 100, the plurality of vertical lift motors 306 may be controlled (e.g., remotely or preprogrammed) by a control system (not shown) in a manner allowing coordinated or independent control of each of the vertical lift motors 306. The control system for the vertical lift motors 306 may either be independent of an existing flight control system of the aircraft 100, or the control system for the vertical lift motors 306 may be integrated into an existing flight control system of the aircraft 100. In an embodiment, the vertical lift rotors 304 may be controlled to generate differential vertical thrust in a manner causing translation of the aircraft 100 along a forward-aft direction and/or along a lateral direction of the aircraft 100. Additionally or alternatively, the vertical lift rotors 304 may be controlled in a manner to generate differential thrust to cause rotation of the aircraft 100 about a roll axis (i.e., the longitudinal axis 110), a pitch axis (lateral axis), and/or a yaw axis (i.e., vertical axis) of the aircraft 100.

Figure 17:
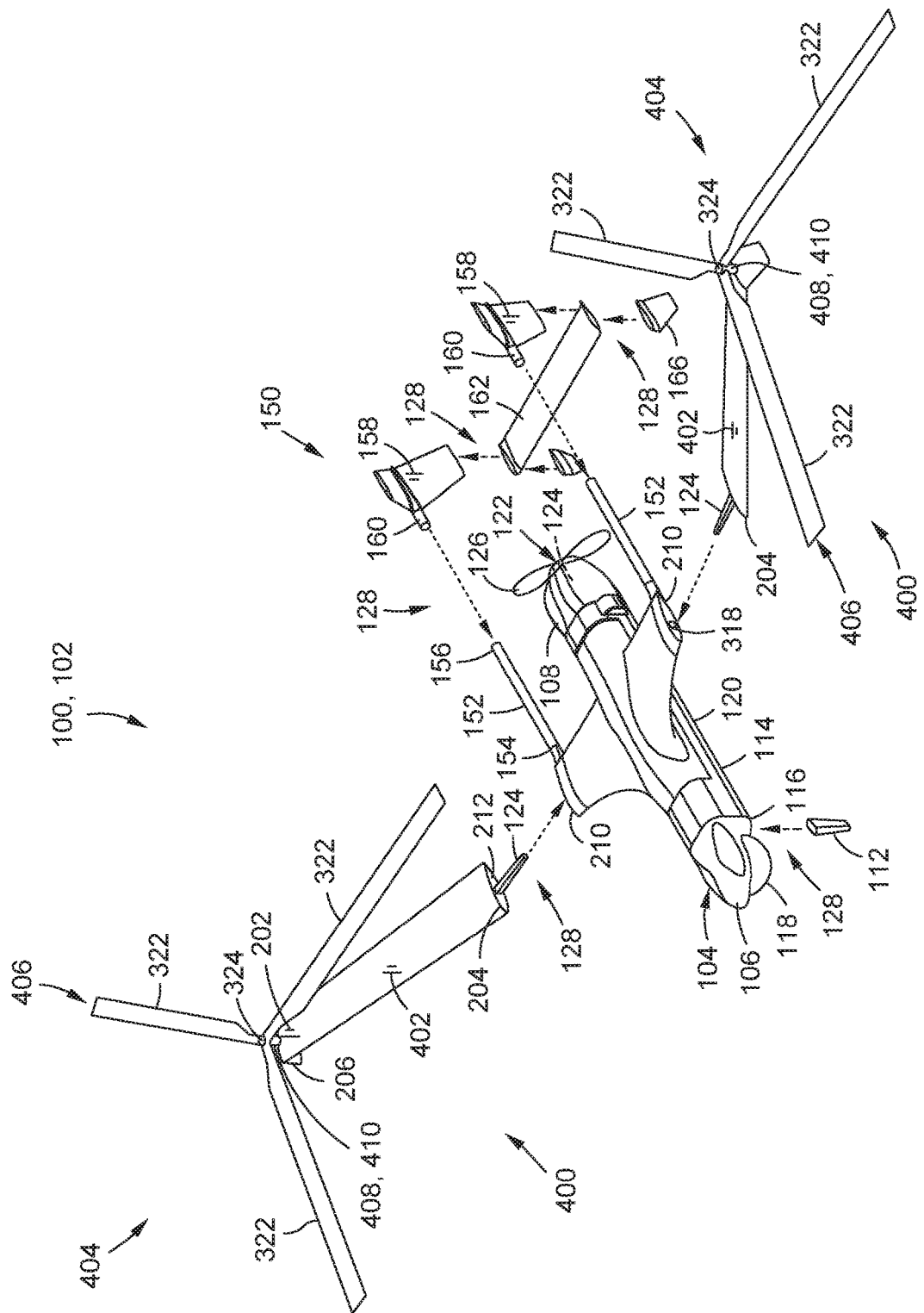
FIG. 17 is a perspective view of an example of a UAV in a disassembled state and having two (2) gyrocopter modules each having a gyro rotor supported on a wing stub configured to be removably coupled to the fuselage module at a field joint between the wing and the wing center portion.
Figure 18:
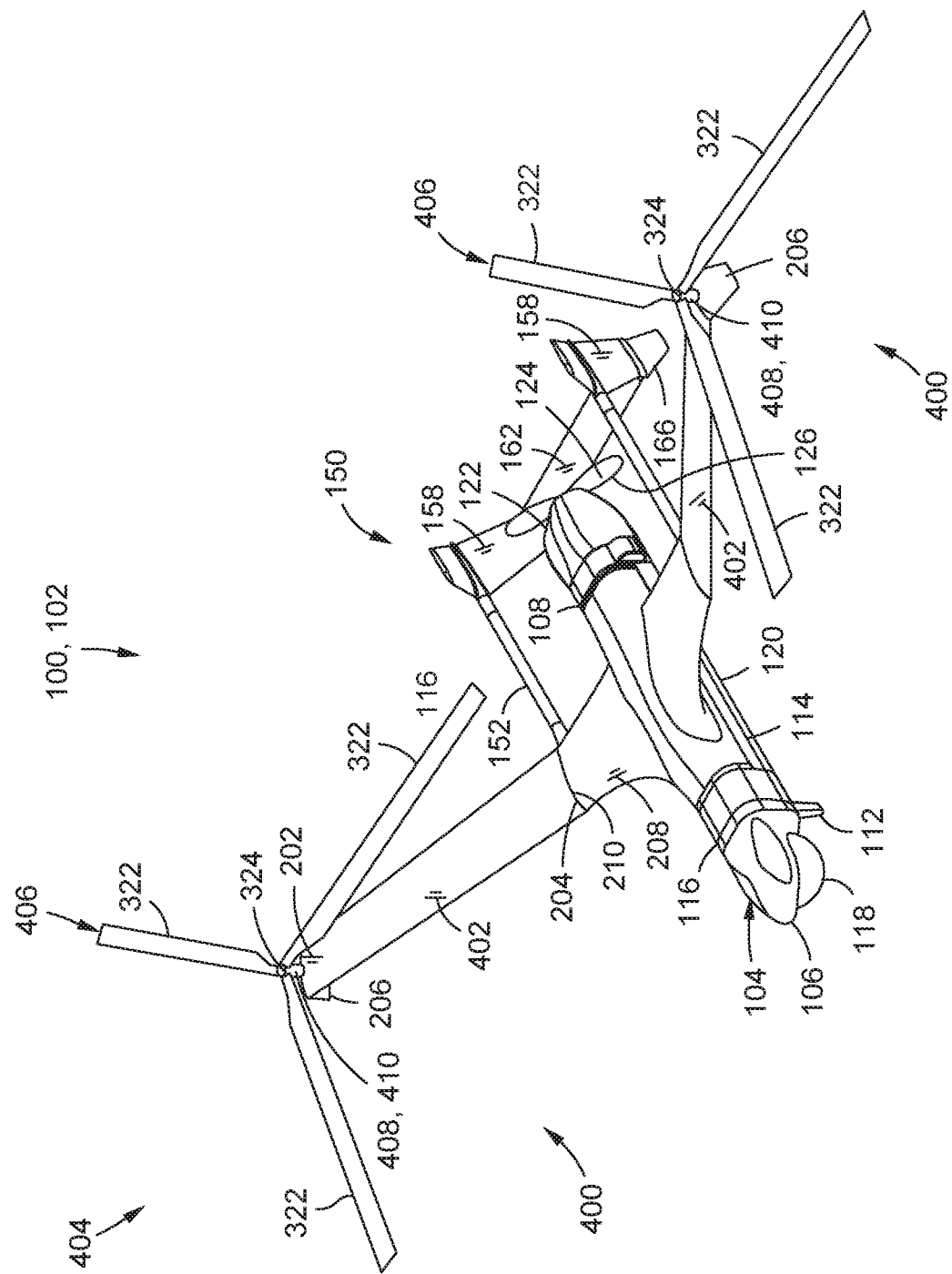
FIG. 18 is a perspective view of the UAV of FIG. 17 in an assembled state.

Referring now to FIG. 17-23, shown is a further example of an aircraft 100 that is field-configurable between the conventional fixed-wing configuration shown in FIGS. 1-3 and a VTOL or near-VTOL configuration (FIGS. 17-23) having a pair of gyrocopter modules 400 that are configured to be removably couplable to the wing center portion 208. FIG. 17 illustrates the aircraft 100 as a UAV 102 shown in a disassembled state. FIGS. 18-21 show the UAV 102 of FIG. 17 in an assembled state. Each one of the gyrocopter modules 400 comprises a gyro assembly 404 and a wing stub 402. Each gyro assembly 404 may be supported on a wing tip 202 of the wing stub 402. The gyro assembly 404 may be fixedly coupled to the wing tip 202 of a wing stub 402. However, in other examples, the gyro assembly 404 may be removably couplable to the wing tip 202. In still further examples the rotor blades 322 of each gyro rotor 406 may be foldable such that all of the rotor blades 322 are bunched together and oriented in the same general direction (not shown) to reduce the footprint of the gyro rotors 406 and thereby simplify packing of the gyrocopter modules 400 into one or more transport cases (not shown) for transporting with other modules (e.g., fuselage module 104, empennage 150, etc.).

Each wing stub 402 is configured to be removably coupled to the wing center portion 208 at a wing root 204 of the wing stub 402. For example, each wing stub 402 may include a joiner spar 214 protruding from the wing root 204 and configured to be inserted into a joiner spar pocket 216 formed in a wing rib 212 located at each one of the laterally opposite sides of the wing center portion 208 in a manner similar to the field-assembly of the wings 200 to the wing center portion 208 as shown in FIGS. 2-3 and described above. However, the wing stubs 402 may be configured to be removably coupled to the wing center portion 208 by means other than the joiner spars 214. For example, the wing stubs 402 may be mechanically coupled to the wing center portion 208 by means of externally-accessible mechanical hardware, such as one or more pins, cams, threaded fasteners, or other wing 200 attachment hardware or structure.

Figure 19:
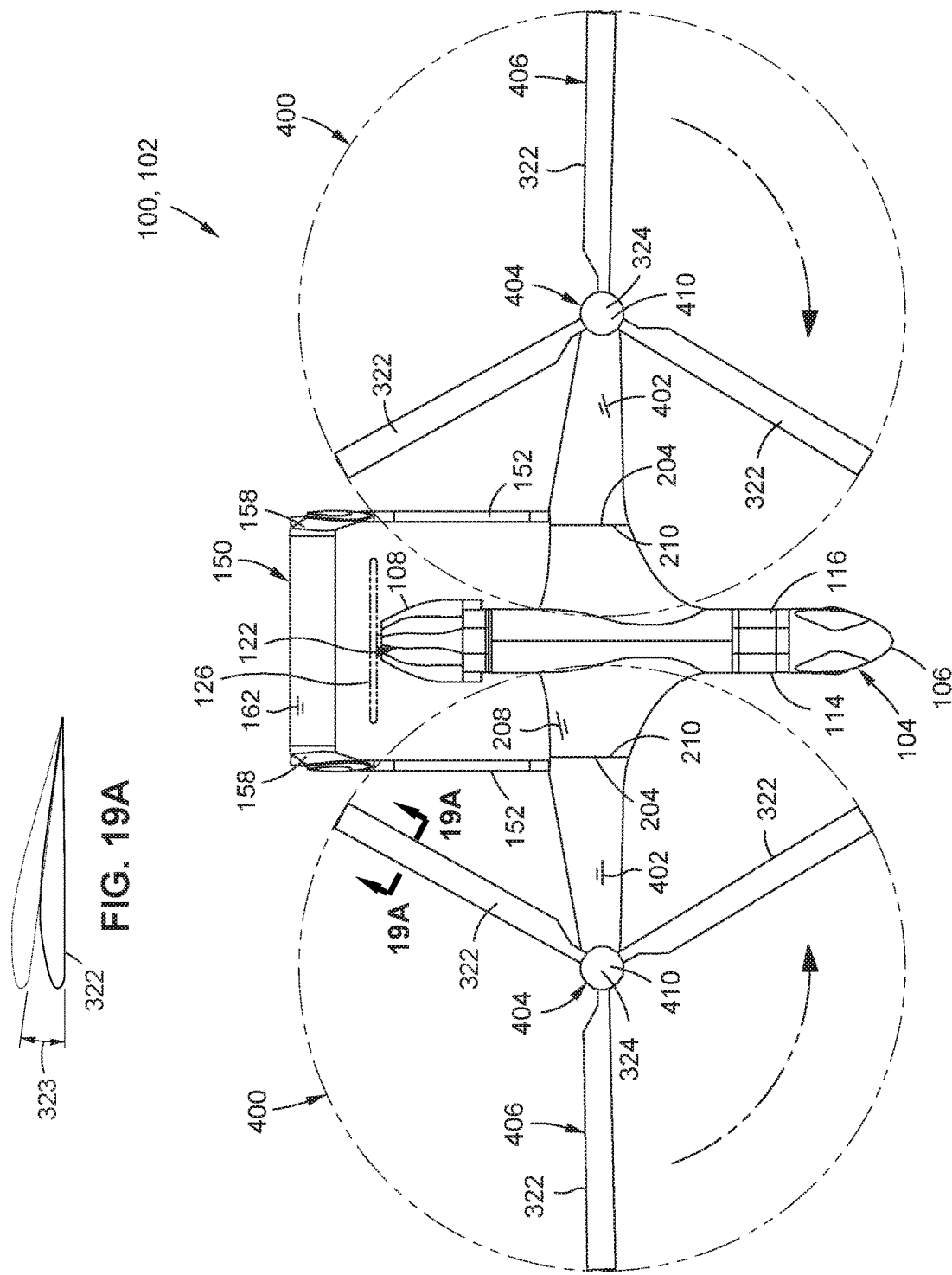
FIG. 19 is a top view of the UAV of FIG. 18 in the assembled state.
Figure 20:
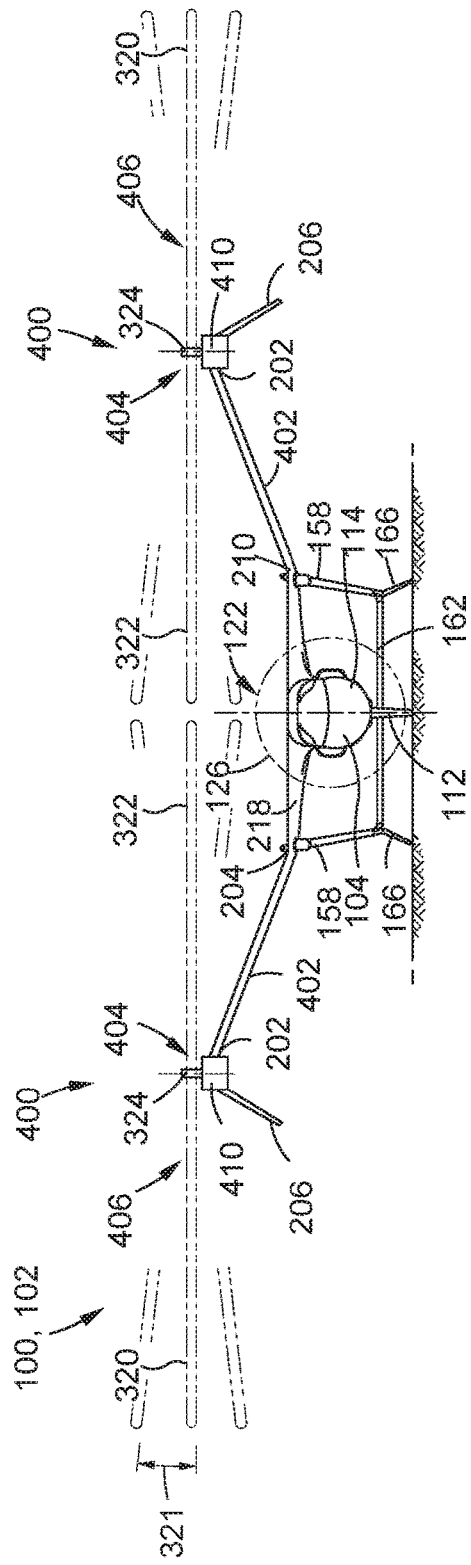
FIG. 20 is a front view of the UAV of FIG. 18 in the assembled state.
Figure 21:
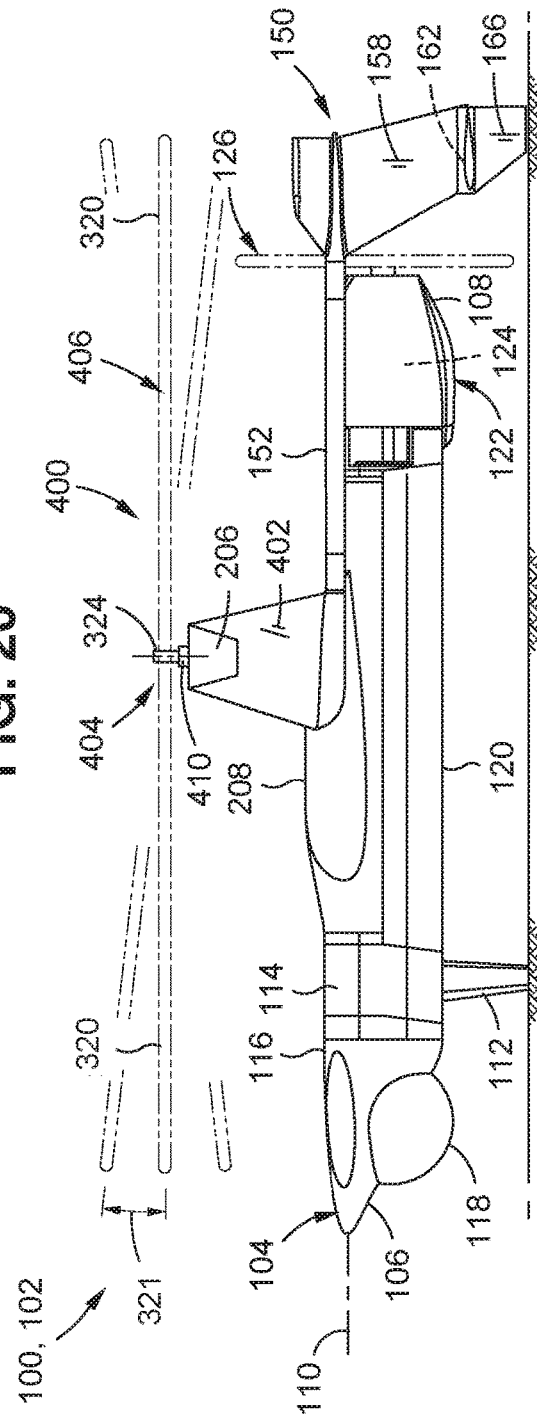
FIG. 21 is a side view of the UAV of FIG. 18 in the assembled state.

Referring to FIGS. 19-21, the gyrocopter modules 400 may be configured such that when the wing stubs 402 are coupled to the wing center portion 208, the gyro rotors 406 are positioned in side-by-side arrangement as shown in FIG. 19. In addition, the wing stubs 402 are configured such that when coupled to the wing center portion 208, each wing stub 402 is oriented at a dihedral angle (FIG. 20) such that the rotor plane 320 of each gyro rotor 406 is higher than other structure of the aircraft 100 (e.g., the rotating propeller 126 of the forward thrust module 122). Positioning the rotor plane 320 of each gyro rotor 406 higher than other structure of the aircraft 100 may allow for a maximum diameter of each gyro rotor 406. In some examples, each wing stub 402 may include a winglet 206 extending downwardly (e.g., at a non-vertical angle) from the wing tip 202. The winglets 206 may improve the aerodynamic performance of the wings 200 by reducing induced drag and/or may provide a location for the mounting of antennae such as for control of the aircraft 100 and communication with onboard systems.

The UAV 102 configuration shown in FIG. 17-23 may have a fuselage module 104 configured similar to the fuselage module 104 of the UAV 102 illustrated in FIGS.

1-14 and described above. For example, the fuselage module 104 of the UAV 102 of FIG. 17-23 may have a fuselage body 114 and a wing center portion 208 which may be fixedly mounted to the fuselage body 114 as described above. In addition, the UAV 102 may include a forward thrust module 122 as described above and which may be removably couplable to the fuselage body 114 at the fuselage aft end 108. In addition, the UAV 102 may include an empennage 150 having a pair of tail booms 152 extending aftwardly from the wing center portion 208. The empennage 150 further includes a pair of vertical tails 158 respectively associated with the tail booms 152.

The field joints 128 by which the empennage 150 is assembled to the aircraft 100 allows for selective orientation of the vertical tails 158 depending on whether the UAV 102 is to be operated as a conventional fixed-wing aircraft (e.g., FIGS. 1-3) or as an aircraft 100 having VTOL or near-VTOL capability (e.g., FIGS. 17-23). As described above, the empennage 150 may be configured to be assembled to the wing center portion 208 such that when the gyrocopter modules 400 are coupled to the aircraft 100 (e.g., FIGS. 4-14 and 17-23), the vertical tails 158 extend generally downwardly from the tail booms 152, and when the gyrocopter modules 400 are omitted from the aircraft 100 (e.g., FIG. 1-3), the vertical tails 158 extend generally upwardly from the tail booms 152. In addition, the empennage 150 includes a horizontal tail 162 that may be removably coupled to the vertical tails 158 (FIG. 17), and may further include tail extensions 166 that are field-couplable to the vertical tails 158, and a nose support 112 that may be field-couplable to the fuselage body 114 as shown in FIG. 17 and described above.

Referring still to FIGS. 17-23, each gyrocopter module 400 has a gyro assembly 404 fixedly coupled to a wing stub 402, as mentioned above. Each gyro assembly 404 has a gyro rotor 406 for generating vertical lift. The gyro rotor 406 may be freely rotatable and may be configured to rotate in response to airflow passing through the gyro rotor 406 such as during forward movement of the aircraft 100 such as under forward thrust generated by the forward thrust module 122. Rotation of the gyro rotors 406 may generate vertical thrust for supporting the mass of the aircraft 100 as described in greater detail below. The wings 200 stubs may be sized and configured to generate aerodynamic lift to augment the vertical thrust (i.e., vertical lift) generated by the rotation of the gyro rotors 406. The gyro rotors 406 may be configured to rotate in opposite directions to reduce the surface area requirements otherwise required in the vertical tails 158 for preventing torque-induced yaw of the aircraft 100.

Referring to FIG. 20, each gyro assembly 404 may include an internal gyro motor 410 which may be integrated into the gyro assembly 404 for rotating of the gyro rotor 406 such as prior to launch. The internal gyro motors 410 may be relatively small electric motors. In an embodiment, each electric motor may be powered by one or more batteries which may be co-located with the electric motor. Alternatively, the batteries may be mounted in a payload bay of the fuselage module 104 such as within the center payload bay 120. Alternatively or additionally, the aircraft 100 may include an electric power module (not shown) for providing electrical power to the internal gyro motor 410. The gyro motors 408 may be configured to pre-rotate the respective gyro rotors 406 up to a predetermined rotational speed prior to liftoff of the aircraft 100. For example, the gyro motors 408 may pre-rotate the gyro rotors 406 up to a rotational speed of approximately 100 percent of the rotational speed required to lift the mass of the aircraft 100 off the ground and optionally climb to a desired altitude.

Each one of the gyro rotors 406 may have a rotor hub 324 with collective pitch control for controlling the rotor blade pitch angle 323 (i.e., angle of attack) of the rotor blades 322. During pre-rotation prior to liftoff, the rotor blades 322 may be adjusted to and held fixed at a rotor blade pitch angle 323 (e.g., FIG. 19A) that causes the rotor blades 322 to generate approximately zero net vertical thrust. Generating zero net vertical thrust may prevent the rotor blades 322 from generating a corresponding opposite torque moment on the airframe. In one example, the rotor blade pitch angle 323 of the gyro rotors 406 may be set at between approximately positive 1 degree and −4 degrees (e.g., between approximately 0 degrees and −2 degrees) which may be a range within which the rotor blades generate zero net vertical thrust. In the present disclosure, the rotor blade pitch angle 323 may be measured with reference to a geometric feature of the rotor blades. For example, the rotor blade pitch angle 323 may be described as the angle between a plane (not shown) perpendicular to the axis of rotation (not shown) of the gyro rotors 406 and the local chord line (not shown) of the rotor blade 322. The local chord line may be described as extending from an aftmost point (relative to the direction of oncoming airflow during blade rotation) of the blade trailing edge (not shown) to a forwardmost point of the blade leading edge (not shown). As may be appreciated, the chord line may be specific to the aerodynamic cross-section of a rotor blade 322. For rotor blades 322 that are twisted (not shown) along the length of the rotor blade 322, the rotor blade pitch angle 323 may be described as the angle between the chord line at one end of the rotor blade 322 and the chord line at an opposite end of the rotor blade 322 when the rotor blade is viewed from the blade tip (not shown). Alternatively, in the present disclosure, the rotor blade pitch angle 323 may be measured with reference to an aerodynamic characteristic of a rotor blade 322. For example, the rotor blade pitch angle 323 may be defined in terms of the chord line and the direction of the relative wind (not shown) passing over the rotor blade 322 during rotation. Regardless of the manner in which the rotor blade pitch angle 323 is measured, the rotor blades 322 are preferably held at a rotor blade pitch angle 323 that causes the rotor blades 322 to generate zero net vertical thrust during pre-rotation of the rotor blades 322 prior to liftoff.

Once the gyro rotors 406 are rotating at the desired rotational speed during pre-rotation, the rotor blade pitch angle 323 (FIG. 19A) may be rapidly (e.g., within several seconds) increased to and fixed at an angle that causes the rotor blades 322 to generate vertical thrust in an amount that causes the aircraft 100 to lift off the ground, and optionally additionally causes the aircraft 100 to ascend to a predetermined altitude prior to the aircraft 100 transitioning to forward flight. For example, the rotor blade pitch angle 323 may be increased by an amount causing the aircraft 100 to lift off the ground and ascend to an altitude of from several feet up to 100 feet prior to initiating the transition to forward flight. In one example, the rotor blade pitch angle 323 may be increased to and held at a positive angle in the range of 5-40 degrees and, more preferably, within 20-30 degrees, and which may cause the rotor blades 322 to generate vertical thrust that lifts the aircraft 100 off the ground. After liftoff and during the transition to forward flight, the rotor blade pitch angle 323 may be reduced and fixed at an angle that is suitable for forward flight of the aircraft 100 at a sustained altitude. For example, the rotor blade pitch angle 323 may be reduced and fixed at an angle within the range of approximately positive 0.5-10 degrees (e.g., within 1-3 degrees) and may remain fixed at such rotor blade pitch angle 323 during the remainder of the flight including during landing.

Forward motion of the aircraft 100 under the propulsive power of the forward thrust module 122 causes the rotor blades 322 to rotate and generate vertical lift for supporting the mass of the aircraft 100. The rotor plane tilt angle 321 (FIG. 21) of both of the gyro rotors 406 may be controlled in a manner to facilitate directional control of the aircraft 100 during forward flight and during landing of the aircraft 100, as described below. For example, FIG. 20 is a front view of the aircraft illustrating the rotor plane tilt angle 321 of the gyro rotors 406 being adjustable in a manner for causing the aircraft 100 to roll to the left or to the right. FIG. 21 is a side view of the aircraft 100 illustrating the rotor plane tilt angle 321 being adjustable in a manner for causing the aircraft to pitch upwardly or downwardly for changing altitude.

The rotor hubs 324 may allow for collective pitch control of the rotor blades 322 to an infinite number of rotor blade pitch angles 323, or the rotor hubs 324 may be limited to a discrete number of rotor blade pitch angles 323 such as by using spring mechanisms (not shown) in the rotor hubs 324. In some examples, the internal electric motor at the rotor hub 324 of each gyro rotor 406 may be operated as a generator (not shown) for generating electrical power for the aircraft 100 such as when descending and/or when the aircraft 100 is being propelled by the forward thrust module 122 and causing rotation of the gyro rotors 406. In other examples, the internal electric motors may be configured to provide vertical thrust in emergency situations during flight, or when the aircraft 100 is operating in marginal flight conditions.

Figure 22:
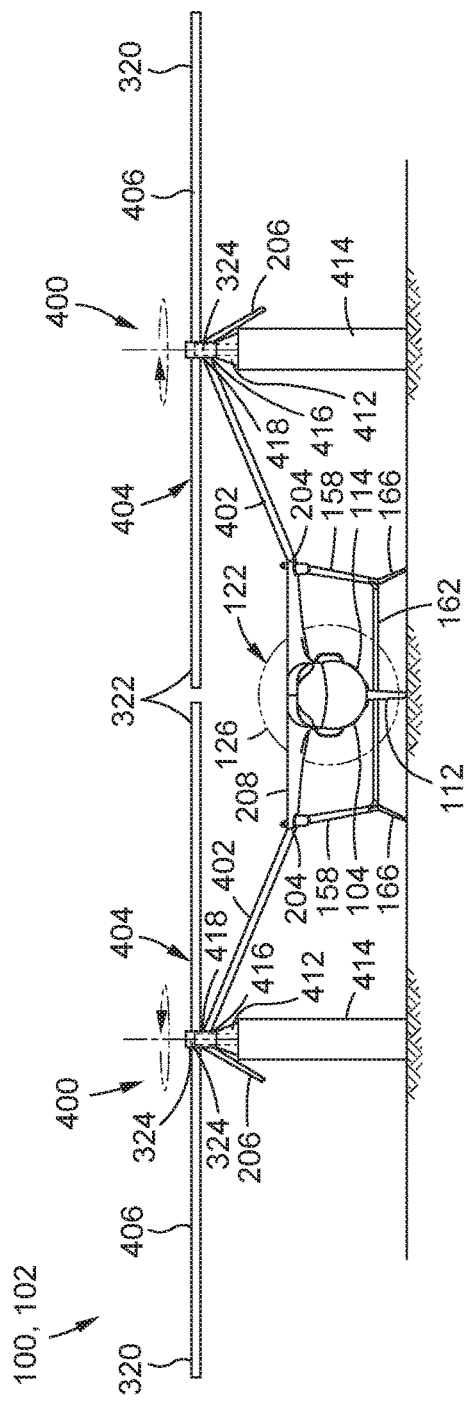
FIG. 22 is a front view of a further embodiment of the UAV of FIG. 18 supported on the ground and further illustrating a pair of pre-rotator ground stands each having an external pre-rotator motor for pre-rotating each gyro rotor prior to vertical takeoff of the UAV.
Figure 23:
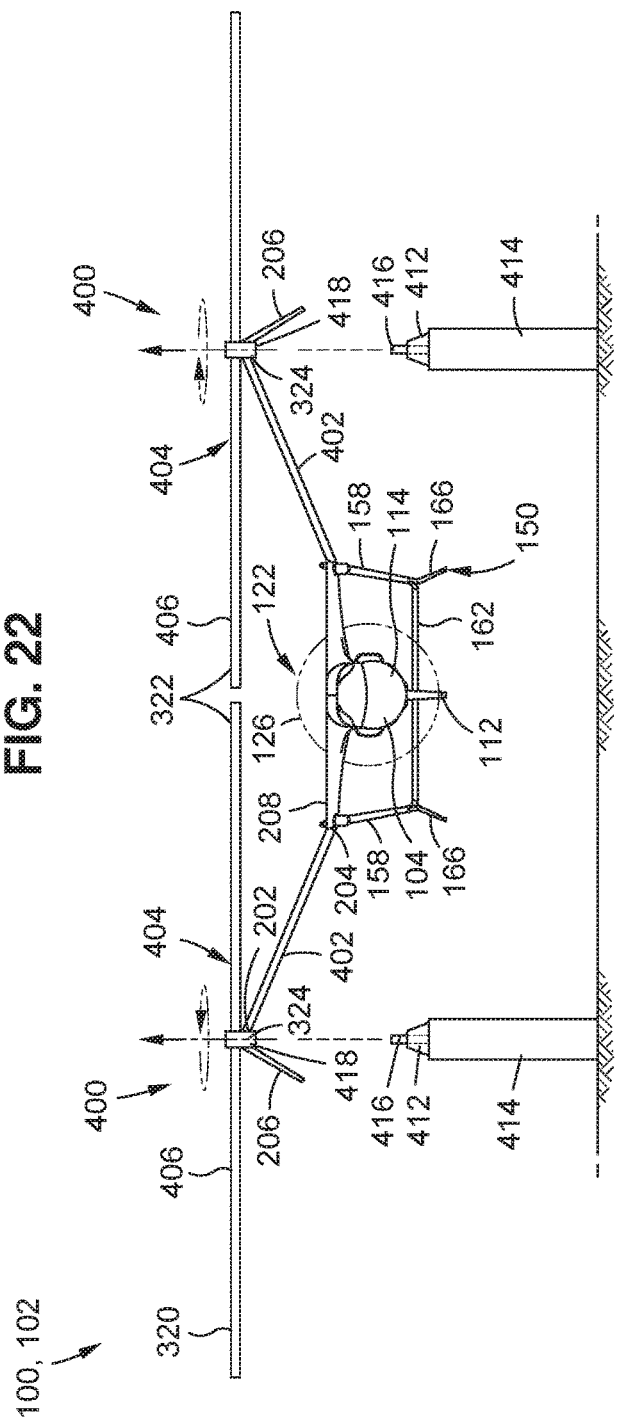
FIG. 23 is a front view of the UAV of FIG. 22 after vertical takeoff.

Referring to FIG. 22-23, in a further example of the UAV 102, each gyro assembly 404 may be configured such that the gyro rotors 406 are pre-rotatable by a pair of external pre-rotator motors 412. The external pre-rotator motors 412 may be electric motors such as commercially-available power drill motors. Each external pre-rotator motor 412 may have a shaft 416 protruding vertically upwardly for engagement into a vertically-oriented hub socket 418 formed in a lower end of the rotor hub 324 of the gyro rotor 406. Each external pre-rotator motor 412 may be supported on a pre-rotator ground stand 414 which may be supported on the ground. With the shafts 416 of the gyro motors 408 respectively engaged into the hub sockets 418 of the gyro rotors 406, the external pre-rotator motors 412 may pre-rotate the gyro rotors 406 up to a rotational speed capable of generating the amount of vertical thrust required to lift the aircraft 100 off the ground. During pre-rotation by the external pre-rotator motors 412, the rotor blades 322 may be set to a rotor blade pitch angle 323 (FIG. 19A) of from 0 to −2 degrees, as mentioned above. Upon reaching the desired rotational speed, the rotor hub 324 of each gyro rotor 406 may increase the rotor blade pitch angle 323 up to a positive angle of approximately 20-30 degrees causing the aircraft 100 to generate vertical thrust and lift the aircraft 100 off the ground as shown in FIG. 23, at which point the shafts 416 slide out of the hub socket 418 as the aircraft 100 ascends.

For the UAV 102 configurations of FIGS. 17-23, the rotor hubs 324 are configured to allow for control of the rotor plane tilt angle 321 (FIG. 21) of the gyro rotors 406 in pitch (FIG. 21) and roll (FIG. 20) for providing the primary source of pitch control and roll control of the aircraft 100 during fight, as mentioned above. The empennage 150 such as the horizontal tail 162 may optionally include one or more movable surfaces such as an elevator (not shown) for augmenting the pitch control provided by adjusting the rotor plane tilt angle 321. The wing stubs 402 may include ailerons (not shown) or other control surfaces which may augment the roll control provided by adjusting the rotor plane tilt angle 321. In the event of a failure of the rotor hubs 324 for tilt control of the rotor plane tilt angle 321, one or more control surfaces of the aircraft 100 (e.g., ailerons of the wing stubs 402) may provide roll control for the aircraft 100.

FIG. 24 is a flowchart of a method 700 of assembling a UAV 102 having gyrocopter modules 400 as shown in FIG. 17-23. Advantageously, the aircraft configurations illustrated in FIG. 17-23 are also field-configurable as a conventional fixed-wing aircraft without VTOL capability as shown in FIG. 1-3. As described above, each one of the gyrocopter modules 400 includes a wing stub 402 supporting a gyro assembly 404. Step 702 of the method includes removably coupling a pair of gyrocopter modules 400 to the aircraft 100 by coupling the wing stub 402 of each one of the gyrocopter modules 400 to one of laterally opposite center portion sides 210 of the wing center portion 208 of the aircraft 100. As described above, the wing stubs 402 are configured to be mechanically coupled to the wing center portion 208 such as by inserting a joiner spar 214 of each wing stub 402 into a joiner spar pocket 216 formed in one of the laterally opposite sides of the wing center portion 208. Alternatively or additionally, each one of the wing stubs 402 may be joined to the wing center portion 208 using externally-accessible mechanical hardware (not shown) such as shear pins, threaded fasteners, and/or other hardware.

As mentioned above, the aircraft 100 includes a plurality of field joints 128 allowing the aircraft 100 to be assembled either with gyrocopter modules 400 as shown in FIG. 17-23 or, alternatively, the field joints 128 allow the aircraft 100 to be assembled with a pair of wings 200 to form a conventional fixed-wing aircraft shown in FIG. 1-3. The empennage 150 may be assembled to the aircraft 100 as described above via a plurality of field joints 128 as shown in FIG. 17. In this regard, the method may include removably coupling the empennage 150 to the wing center portion 208 by coupling the pair of vertical tails 158 to the boom aft end 156 respectively of the pair of tail booms 152 as shown in FIG. 17. Alternatively, for the empennage 150 embodiment illustrated in FIG. 2, the method may include removably coupling the boom forward end 154 of each one of the tail booms 152 to the wing center portion 208. In the embodiment of FIG. 2, each one of the tail booms 152 has a vertical tail 158 fixedly coupled to the boom aft end 156. The method may additionally include removably coupling a horizontal tail 162 to each one of a pair of vertical tails 158 respectively extending outwardly from the pair of tail booms 152. As described above, tail extensions 166 may be removably coupled to the vertical tails 158 for supporting the aft and the aircraft 100. Additionally, a nose support 112 may be removably coupled to the fuselage forward end 106 for supporting the forward end of the aircraft 100 as described above. The aircraft 100 may be supported on the nose support 112 and on the pair of tail extensions 166 prior to takeoff and/or upon landing.

In some examples of the UAV 102, step 702 of removably coupling the gyrocopter modules 400 to the aircraft 100 includes removably coupling the gyrocopter modules 400 for which each gyro assembly 404 includes a internal gyro motor 410. As mentioned above, an internal gyro motor 410 may be integrated into the rotor hub 324 of each one of the gyro rotors 406 and may allow for pre-rotation of the gyro rotor 406 to facilitate vertical liftoff of the aircraft 100. Alternatively, for the UAV 102 embodiment illustrated in FIG. 22-23, step 702 of removably coupling the gyrocopter modules 400 to the aircraft 100 includes removably coupling the gyrocopter modules 400 of which each gyro rotor 406 is pre-rotatable by an external pre-rotator motor 412. As shown in FIGS. 22-23 and described above, each one of the external pre-rotator motors 412 may be supported by a pre-rotator ground stand 414. Each external pre-rotator motor 412 may have a shaft 416 protruding upwardly and configured to engage a hub socket 418 formed in a lower end of the rotor hub 324 of the gyro rotor 406 for pre-rotation of the gyro rotors 406. As the aircraft 100 lifts off the ground, each one of the external pre-rotator motors 412 is configured to decouple from the hub socket of the gyro rotor 406.

Figure 25:
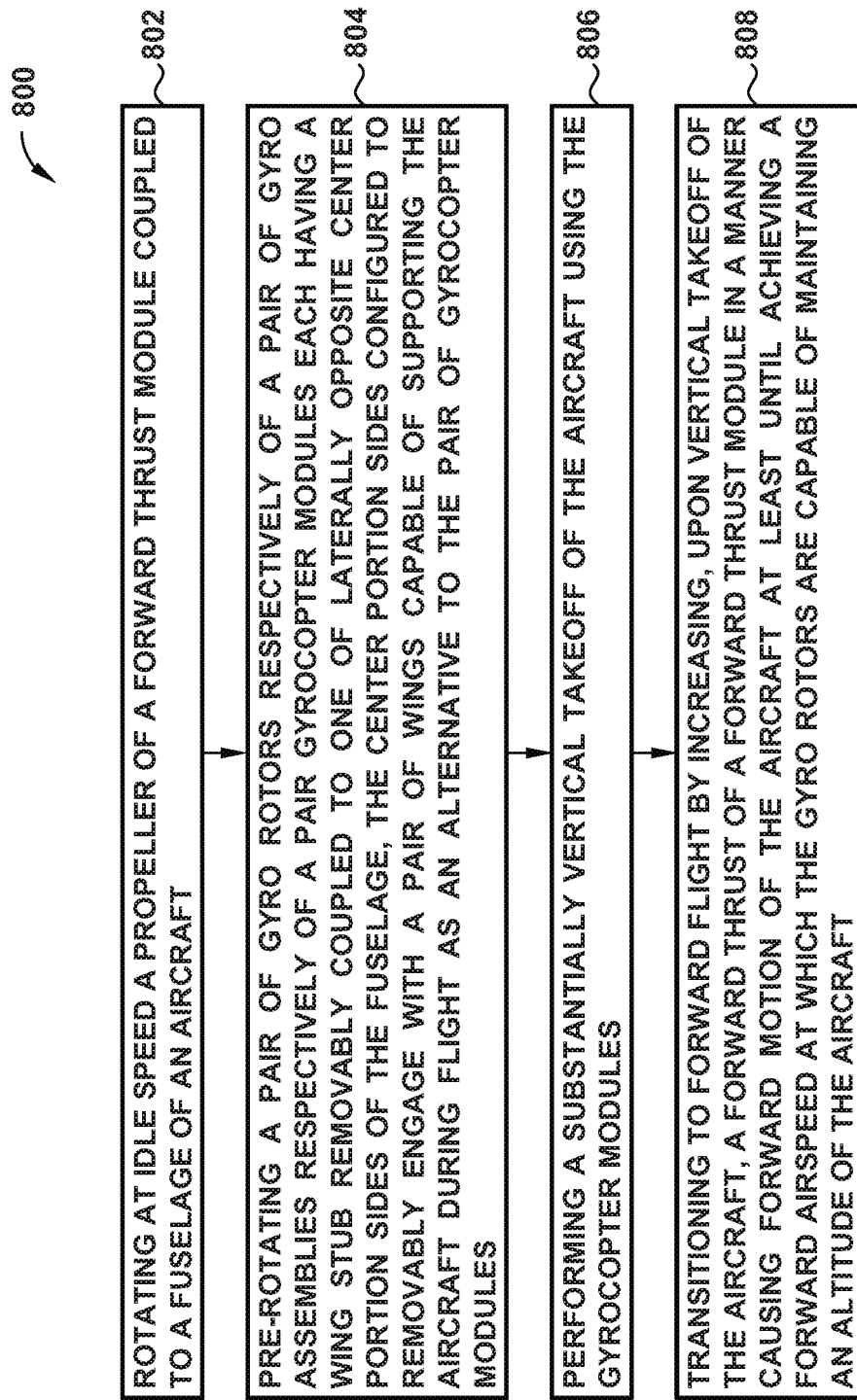
FIG. 25 is a flowchart of a method of operating a UAV having gyrocopter modules.

FIG. 25 is a flowchart of a method 800 of enhancing the operation of a UAV 102 having gyrocopter modules 400 as shown in FIG. 17-23. Prior to vertical takeoff of the aircraft 100, the method 800 may include step 802 of rotating the propeller 126 of the forward thrust module 122 at a relatively low rotational speed (e.g., at idle speed) to confirm nominal operation of the engine 124 prior to takeoff the aircraft 100. Step 804 of the method 800 includes pre-rotating the pair of gyro rotors 406 respectively of the pair of gyrocopter modules 400. The step 804 of pre-rotating the gyro rotors 406 may include pre-rotating the gyro rotor 406 of each gyro assembly with the rotor blades 322 adjusted to a rotor blade pitch angle 323 that results in each gyro rotor 406 generating zero net vertical lift. For example, in the pre-rotation example described above, the rotor blade pitch angle 323 may be adjusted to and fixed at between approximately positive 1 degree and −4 degrees which may be a range within which the rotor blades 322 generate zero net vertical thrust to allow the gyro rotors 406 to increase rotational speed without lifting the aircraft 100 off the ground.

In an embodiment, the step 804 of pre-rotating the gyro rotors 406 may include pre-rotating the gyro rotor 406 of each gyro assembly 404 using an internal gyro motor 410 that may be integrated into the gyro assembly 404. In an embodiment described above, each internal gyro motor 410 may be configured as a relatively small electric motor. Alternatively, in the embodiment shown in FIG. 22-23, the step 804 of pre-rotating the gyro rotors 406 may include pre-rotating the gyro rotor 406 of each gyro assembly 404 using an external pre-rotator motor 412 supported on a pre-rotator ground stand 414. As mentioned above, each external pre-rotator motor 412 may be configured to decouple from the gyro motor 408 during vertical takeoff of the aircraft 100. As was also mentioned above, during pre-rotation of the gyro rotors 406, the rotor blades 322 may be set to a rotor blade pitch angle 323 that prevents the gyro rotors from generating vertical lift and the associated torque forces on the airframe. In some examples, the gyro rotors 406 may be pre-rotated up to a rotational speed that is at least 100 percent of the rotational speed required to achieve vertical liftoff of the aircraft 100 prior to forward motion of the aircraft 100.

Step 806 of the method 800 includes performing a substantially vertical takeoff of the aircraft 100 following pre-rotation of the gyro rotors 406. In this regard, step 806 may include rapidly (e.g., within several seconds) increasing the rotor blade pitch angle 323 (FIG. 19A) of the rotor blades 322 by an amount that causes the aircraft 100 to lift off of a surface (e.g., the ground). For example, the rotor blade pitch angle 323 may be increased from the angle that generates zero net lift during pre-rotation, to a positive pitch angle that causes the aircraft 100 to substantially vertically lift off the ground and optionally causes the aircraft 100 to ascend to a predetermined altitude prior to the aircraft 100 initiating forward flight. In the above-described example, the rotor blades 322 of the gyro rotors 406 may be adjusted to a rotor blade pitch angle 323 of up to positive 30 degrees. In some examples, vertical liftoff of the aircraft 100 may be performed with substantially no forward motion of the aircraft 100 prior to liftoff. As mentioned above, after liftoff, the rotor blade pitch angle 323 may be reduced to a relatively small pitch angle which may be a positive pitch angle, and may remain fixed at such pitch angle during the remainder of the flight.

Step 808 of the method 800 includes transitioning the aircraft 100 to forward flight after vertical takeoff of the aircraft 100. Transitioning the aircraft 100 to forward flight may be facilitated by increasing forward thrust of the forward thrust module 122 such as by increasing the rotational speed of the propeller 126 of the forward thrust module 122. In some examples, the rotational speed of the propeller 126 may be increased simultaneous with the separation of the aircraft 100 from the surface during liftoff. The rotational speed of the propeller 126 may be increased at least until the aircraft 100 achieves a forward airspeed at which the gyro rotors 406 are capable of maintaining the aircraft 100 at a desired altitude. Transitioning to forward flight may include reducing the rotor blade pitch angle by an amount that allows the gyro rotors 406 to maintain the aircraft 100 at altitude when moving at the forward airspeed. As mentioned above, each gyro rotor 406 is configured to generate vertical thrust during rotation in response to the airflow passing through the gyro rotor 406 during forward motion of the aircraft 100. In some examples, the wing stubs 402 may generate a small amount of aerodynamic lift to augment the vertical lift generated by the gyro rotors 406 during forward motion of the aircraft 100.

As mentioned above, each one of the gyro rotors 406 includes a rotor hub 324 configured to allow for control of the rotor plane tilt angle 321 (FIG. 21) in a manner allowing for pitch control (FIG. 21) and roll control (FIG. 20) of the aircraft 100 during flight. In this regard, control of the direction, attitude, airspeed, and altitude of the aircraft 100 may be facilitated by controlling (e.g., via remote control or preprogramming) the rotational speed of the propeller 126 in conjunction with controlling the rotor plane tilt angle 321 of the gyro rotors 406. Additionally, pitch control and/or roll control of the aircraft 100 may be augmented by deflecting one or more flight control surfaces (e.g., ailerons) that may be included with the aircraft 100.

In transitioning the aircraft 100 from forward flight to vertical or near-vertical landing, the method may include flying the aircraft 100 in a controlled descent toward a landing zone (not shown) under forward thrust of the forward thrust module 122 while supporting the mass of the aircraft 100 using vertical thrust generated by the gyro assemblies 404. For example, upon nearing the landing zone, the method may include diving the aircraft 100 as a means to increase the rotational speed of the gyro rotors 406 and then increasing in pitch (FIG. 21) the rotor plane tilt angle 321 while simultaneously reducing forward thrust of the forward thrust module 122 such as by reducing the rotational speed of the propeller 126 (e.g., to idle) to reduce the forward speed of the aircraft 100. The landing operation may include flaring the aircraft 100 at a relatively low altitude above the landing zone during which the rotational speed of the gyro rotors 406 may be increased by abruptly increasing (e.g., in pitch) the rotor plane tilt angle 321 immediately prior to touchdown to further reduce the rate of vertical descent of the aircraft 100 and/or to substantially reduce forward motion of the aircraft 100. In some examples, the gyro rotors 406 and the forward thrust module 122 may be controlled in a manner such that forward motion of the aircraft 100 is stopped immediately prior to the aircraft 100 landing on a surface of the landing zone. During landing, the method may include supporting the aircraft 100 on a nose support 112 and on a pair of tail extensions 166. However, the aircraft 100 may be configured to be capable of a relatively small amount of lateral motion and/or forward motion during landing.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. An aircraft, comprising:
    a fuselage module, comprised of a fuselage body and a wing center portion, the wing center portion having laterally opposite center portion sides;
    a pair of wings each having a wing root removably couplable to the wing center portion respectively proximate one of the laterally opposite center portion sides;
    a pair of vertical lift rotor modules, each having a longitudinal rotor boom having a boom mounting portion and a pair of boom free ends, at least one vertical lift rotor mounted on each boom free end, the boom mounting portion of each longitudinal rotor boom is removably couplable between the wing center portion and the wing root, and each longitudinal rotor boom extends both forwardly and aftwardly of the wing center portion, and resulting in a pair of the vertical lift rotors respectively located on the laterally opposite center portion sides, and a pair of the vertical lift rotors respectively located forward of and aft of the wing center portion;
    an empennage comprising:
        a pair of tail booms aftwardly extendable from the wing center portion;
        a pair of vertical tails couplable to the boom aft end respectively of the pair of tail booms;
        a horizontal tail extendable between free ends respectively of the pair of vertical tails;
        when the pair of vertical lift rotor modules are omitted from the aircraft, the pair of vertical tails are oriented to extend upwardly from the tail booms, and the horizontal tail is above the tail booms;
        when the pair of vertical lift rotor modules are coupled to the aircraft, the pair of vertical tails are oriented to extend downwardly from the tail booms, and the horizontal tail is below the tail booms; and
    a forward thrust module removably couplable to the fuselage body.

2. The aircraft of claim 1, wherein:
    each one of the tail booms has a boom forward end and a boom aft end, the empennage is coupled to the wing center portion in one of the following two configurations:
        the boom forward end of each one of the tail booms is fixedly coupled to the wing center portion, and the pair of vertical tails are each removably couplable to the boom aft end of one of the tail booms; and
        the boom forward end of each one of the tail booms is removably couplable to the wing center portion, and the pair of vertical tails are each fixedly coupled to the boom aft end of one of the tail booms.

3. The aircraft of claim 2, wherein:
    the horizontal tail is removably couplable between the pair of pair of vertical tails.

4. A method of operating an aircraft, comprising:
    removably coupling a pair of vertical lift rotor modules to a wing center portion of a fuselage module, by removably coupling a boom mounting portion of a longitudinal rotor boom of each vertical lift rotor module to one of laterally opposite center portion sides of the wing center portion, each longitudinal rotor boom extending both forwardly and aftwardly of the wing center portion, each longitudinal rotor boom having the boom mounting portion and a pair of boom free ends, each boom free end supporting at least one vertical lift rotor, the pair of vertical lift rotor modules are configured such that when coupled to the wing center portion, a pair of the vertical lift rotors are respectively located on the laterally opposite center portion sides of the wing center portion, and a pair of the vertical lift rotors are respectively located forward of and aft of the wing center portion;
    removably coupling an empennage to the wing center portion, the empennage comprising:
        a pair of tail booms extending aftwardly from the wing center portion;
        a pair of vertical tails couplable to the boom aft end respectively of the pair of tail booms;
        a horizontal tail extendable between free ends respectively of the pair of vertical tails;
        when the pair of vertical lift rotor modules are omitted from the aircraft, the pair of vertical tails are oriented to extend upwardly from the tail booms, and the horizontal tail is above the tail booms;
        when the pair of vertical lift rotor modules are coupled to the aircraft, the pair of vertical tails are oriented to extend downwardly from the tail booms, and the horizontal tail is below the tail booms; and
    removably coupling a pair of wings to the laterally opposite center portion sides of the wing center portion such that each longitudinal rotor boom is removably coupled between the wing center portion and a wing root of one of the wings, the fuselage module having a fuselage body, and forward thrust module coupled to the fuselage body for forward propulsion of the aircraft.

5. The method of claim 4, wherein the rotor booms comprise longitudinal rotor booms, the step of removably coupling the boom mounting portion of each rotor boom to the wing center portion comprising:
    removably coupling the boom mounting portion of each longitudinal rotor boom to the wing center portion in a manner such that the longitudinal rotor booms extend generally forwardly and aftwardly from the wing center portion; and
    removably coupling the pair of wings respectively to the laterally opposite center portion sides of the wing center portion such that the boom mounting portion of each one of the longitudinal rotor booms is located between a wing and a laterally opposite center portion side.

6. The method of claim 4, wherein:
    removably coupling the empennage to the wing center portion comprises one of the following:

removably coupling the pair of vertical tails to the boom aft end of the pair of tail booms each having a boom forward end fixedly coupled to the wing center portion; and removably coupling a boom forward end of each one of the pair of tail booms to the wing center portion, each one of the tail booms having one of the pair of vertical tails fixedly coupled to the boom aft end of one of the tail booms.

7. A method of improving operation of an aircraft, comprising:

performing a vertical takeoff of the aircraft using a pair of vertical lift rotor modules removably coupled to a wing center portion of a fuselage module of the aircraft, each vertical lift rotor module having a longitudinal rotor boom having a boom mounting portion and a pair of boom free ends, each boom free end supporting at least one vertical lift rotor, the boom mounting portion of each longitudinal rotor boom is removably coupled between the wing center portion and a wing root of one of a pair of wings, each wing is removably coupled to the wing center portion proximate one of laterally opposite center portion sides of the wing center portion, and each longitudinal rotor boom extends both forwardly and aftwardly of the wing center portion, such that a pair of the vertical lift rotors are located on each of the laterally opposite center portion sides of the wing center portion, and a pair of the vertical lift rotors are respectively located forward of and aft of the wing center portion;

the aircraft including:
an empennage comprising:
a pair of tail booms extending aftwardly from the wing center portion;
a pair of vertical tails couplable to the boom aft end respectively of the pair of tail booms;
a horizontal tail extendable between free ends respectively of the pair of vertical tails;
when the pair of vertical lift rotor modules are omitted from the aircraft, the pair of vertical tails are oriented to extend upwardly from the tail booms, and the horizontal tail is above the tail booms;
when the pair of vertical lift rotor modules are coupled to the aircraft, the pair of vertical tails are oriented to extend downwardly from the tail booms, and the horizontal tail is below the tail booms; and
a forward thrust module removably coupled to a fuselage body.

8. The method of claim 7, further comprising:
transitioning the aircraft from hover flight to forward flight by performing the following:
controlling the vertical lift rotors to achieve forward movement of the aircraft at least at a forward airspeed at which the pair of wings are capable of supporting the aircraft;
stopping rotation of the vertical lift rotors and increasing forward thrust of the forward thrust module;
allowing a forward end of the aircraft to drop while increasing the forward airspeed under power of the forward thrust module; and
supporting the aircraft using aerodynamic lift generated by the pair of wings.

9. The method of claim 7, further comprising:
transitioning the aircraft from forward flight to landing by performing the following:

flying, under power of the forward thrust module, the aircraft into proximity over a landing zone;
activating the vertical lift rotors and increasing a rotational speed of the vertical lift rotors until capable of supporting the aircraft in hover flight;
reducing forward thrust of the forward thrust module; and
controlling the rotational speed of the vertical lift rotors to reduce an altitude of the aircraft until landing.

10. The method of claim 7, further including:
supporting the aircraft on a nose support and the pair of vertical tails during at least one of a takeoff and a landing of the aircraft;
the nose support extending downwardly from a fuselage forward end of the fuselage module; and
the pair of vertical tails extending downwardly from the pair of tail booms removably coupled to the wing center portion.

11. The aircraft of claim 2, wherein:
each of the tail booms is removably couplable to the wing center portion using externally-accessible mechanical fasteners.

12. The aircraft of claim 2, further including:
a tail extension removably couplable to each vertical tail and extending downwardly, for supporting the aft end of the aircraft on a surface when the pair of vertical lift rotor modules are coupled to the aircraft.

13. The aircraft of claim 1, wherein:
the at least one vertical lift rotor comprises counter-rotating rotors driven by the vertical lift motor.

14. The aircraft of claim 1, wherein:
each one of the vertical lift motors is an electric motor.

15. The aircraft of claim 14, wherein:
the fuselage module includes a center payload bay configured to removably house one or more batteries configured to power the vertical lift motors.

16. The aircraft of claim 1, further including:
a nose support configured to extend downwardly from the fuselage module for supporting a fuselage forward end.

17. The aircraft of claim 1, wherein:
the fuselage module includes a forward payload bay configured to house at least one of an infrared sensor, an electro-optical sensor, a still camera, and a video camera.

18. The aircraft of claim 1, wherein:
the aircraft has a longitudinal axis; and
the boom mounting portion of each longitudinal rotor boom is oriented parallel to the longitudinal axis.

19. The aircraft of claim 1, wherein:
a portion of the longitudinal rotor boom extending forward of the wing center portion is parallel to the tail boom that is located on the same side of the aircraft as the longitudinal rotor boom.

20. The aircraft of claim 1, wherein:
a portion of the longitudinal rotor boom extending aft of the wing center portion is angled laterally outwardly from the tail boom that is located on the same side of the aircraft as the longitudinal rotor boom.

21. The aircraft of claim 1, wherein:
each vertical tail is oriented at an angle of between +45 degrees and −45 degrees relative to vertical.

22. The aircraft of claim 1, wherein:
each vertical tail is oriented at an inwardly-canted angle relative to vertical.

* * * * *